(12) United States Patent
Ness et al.

(10) Patent No.: US 10,008,759 B2
(45) Date of Patent: Jun. 26, 2018

(54) STABILIZED PLATFORM FOR A WIRELESS COMMUNICATION LINK

(71) Applicant: E M SOLUTIONS PTY LTD, Yeronga (AU)

(72) Inventors: John Ness, Pullenvale (AU); Glen Callaghan, Sherwood (AU); Richard Harris, Karana Downs (AU); Tui Rutherford, Highvale (AU)

(73) Assignee: E M Solutions PTY LTD, Yeronga, Queensland (AU)

( * ) Notice: Subject to any disclaimer, the term of this patent is extended or adjusted under 35 U.S.C. 154(b) by 124 days.

(21) Appl. No.: 14/896,291

(22) PCT Filed: Jun. 11, 2014

(86) PCT No.: PCT/AU2014/000599
§ 371 (c)(1),
(2) Date: Dec. 4, 2015

(87) PCT Pub. No.: WO2014/197926
PCT Pub. Date: Dec. 18, 2014

(65) Prior Publication Data
US 2016/0134006 A1 May 12, 2016

(30) Foreign Application Priority Data

Jun. 11, 2013 (AU) ................................ 2013902090
Mar. 25, 2014 (AU) ................................ 2014901057

(51) Int. Cl.
*H01Q 1/12* (2006.01)
*H01Q 3/08* (2006.01)
(Continued)

(52) U.S. Cl.
CPC ............. *H01Q 1/1257* (2013.01); *G01S 3/38* (2013.01); *H01Q 3/02* (2013.01); *H01Q 3/08* (2013.01);
(Continued)

(58) Field of Classification Search
CPC .......... H01Q 1/1257; H01Q 3/02; H01Q 3/08; H01Q 5/55; H01Q 13/025
See application file for complete search history.

(56) References Cited

U.S. PATENT DOCUMENTS 4,837,576 A    6/1989  Schwarz
6,690,917 B2 *  2/2004  Soliman .................... G01S 3/14
                                                  342/118

(Continued)

FOREIGN PATENT DOCUMENTS

GB    2459131 A       10/2009
WO    2002063791 A1    8/2002
WO    2003007420 A1    1/2003

OTHER PUBLICATIONS

Supplementary European Search Report dated Jun. 2, 2017 of European Application No. 14811651.0 filed Jun. 11, 2014.
(Continued)

*Primary Examiner* — Hoang Nguyen
(74) *Attorney, Agent, or Firm* — Sorell, Lenna & Schmidt, LLP

(57) ABSTRACT

A terrestrial data communications wireless link includes a first link end that has a first directional antenna, a first beacon and a first redirecting assembly coupled to the first directional antenna. The wireless link also includes a second link end having a second directional antenna, a second beacon and a second redirecting assembly coupled to the second directional antenna. In use the first directional antenna and the second directional antenna are maintained in mutual alignment by the first redirecting assembly redirect-
(Continued)

ing the first directional antenna in response to a signal from the second beacon and the second redirecting assembly redirecting the second directional antenna in response to a signal from the first beacon.

10 Claims, 23 Drawing Sheets

(51) Int. Cl.
*H01Q 13/02* (2006.01)
*H01Q 19/19* (2006.01)
*H01Q 5/55* (2015.01)
*H01Q 3/02* (2006.01)
*G01S 3/38* (2006.01)

(52) U.S. Cl.
CPC ............. *H01Q 5/55* (2015.01); *H01Q 13/025* (2013.01); *H01Q 19/19* (2013.01)

(56) References Cited

U.S. PATENT DOCUMENTS

| | | | |
|---|---|---|---|
| 7,680,516 | B2 | 3/2010 | Lovberg et al. |
| 2004/0203528 | A1 | 10/2004 | Ammar et al. |
| 2005/0277402 | A1 | 12/2005 | Yowakim et al. |
| 2007/0031151 | A1 | 2/2007 | Cunningham et al. |
| 2008/0122683 | A1 | 5/2008 | Howley et al. |
| 2010/0201589 | A1 | 8/2010 | Hellberg |

OTHER PUBLICATIONS

International Preliminary Report on Patentability dated Sep. 2, 2015, issued by the International Preliminary Examining Authority in International Application No. PCT/AU2014/000599 filed on Jun. 11, 2014.

International Search Report of the International Searching Authority dated Sep. 5, 2014 which issued in International Application No. PCT/AU2014/000599 filed on Jun. 11, 2014.

\* cited by examiner

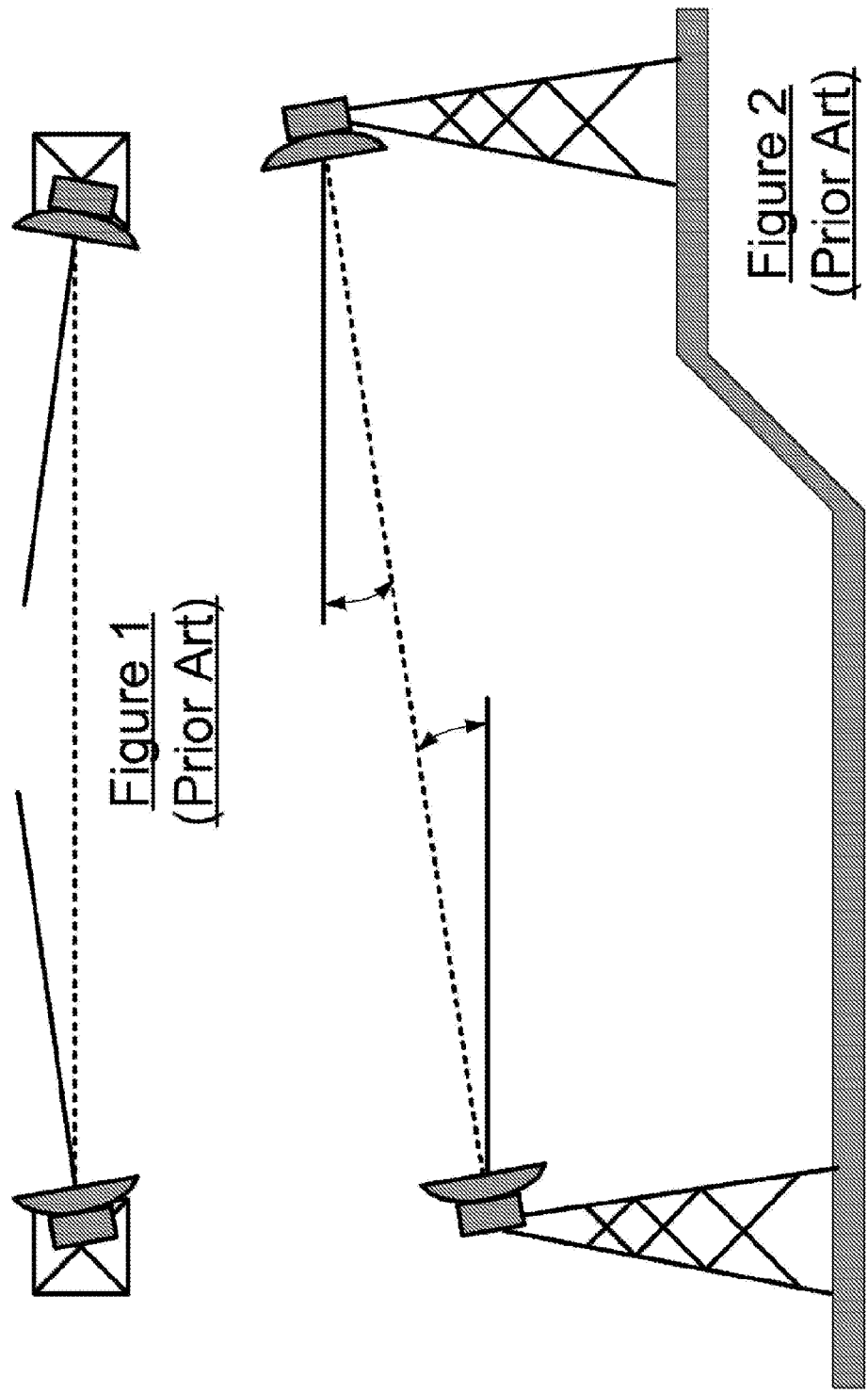

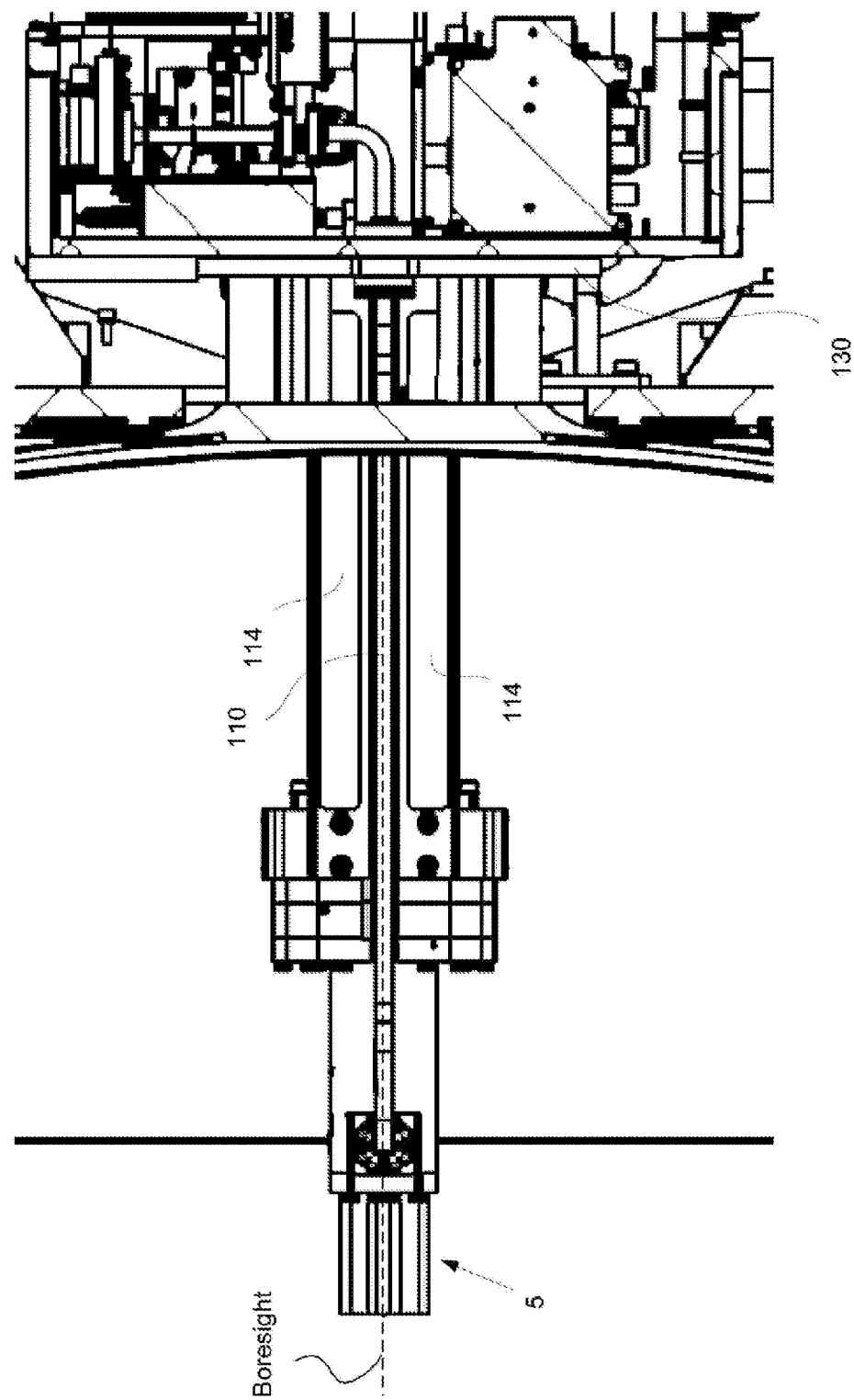

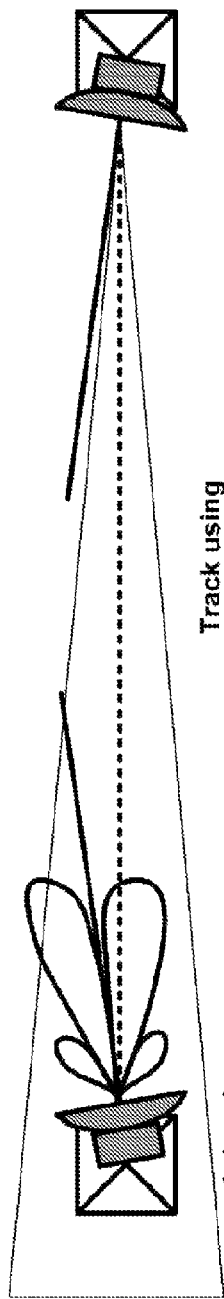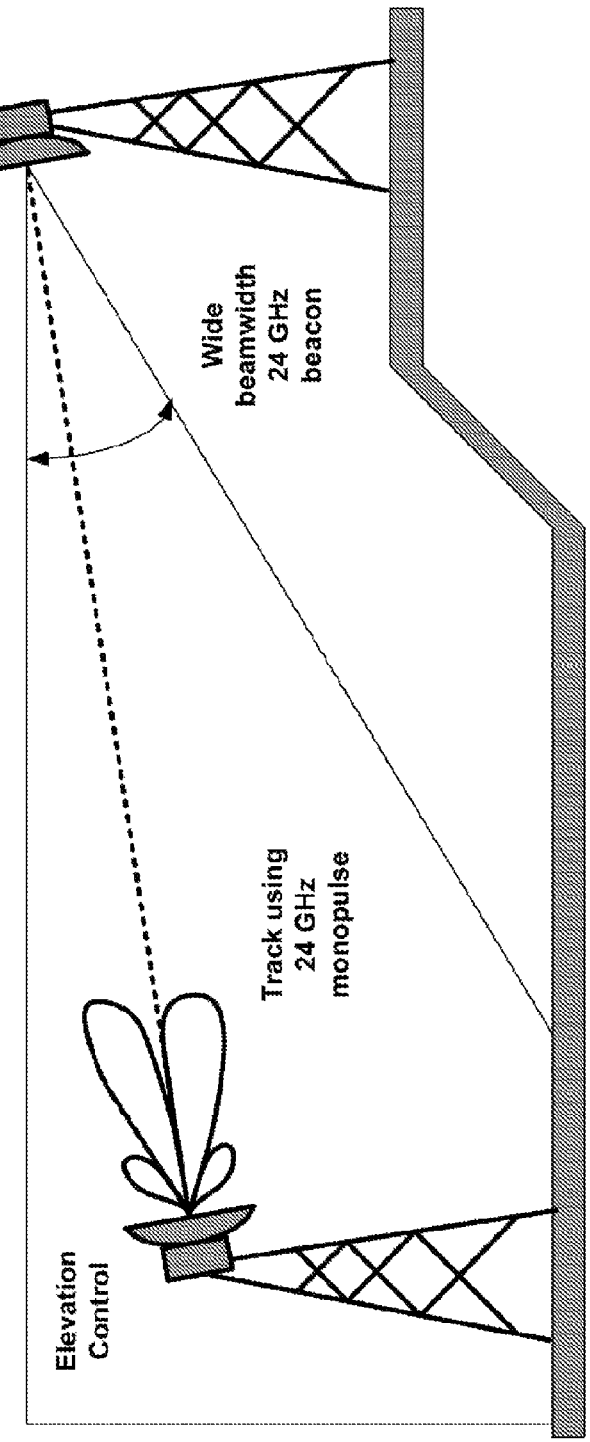
Figure 6A
Figure 6B

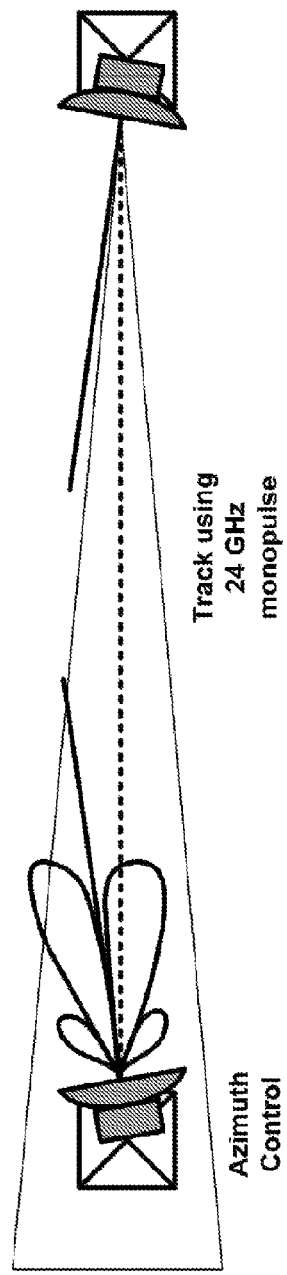
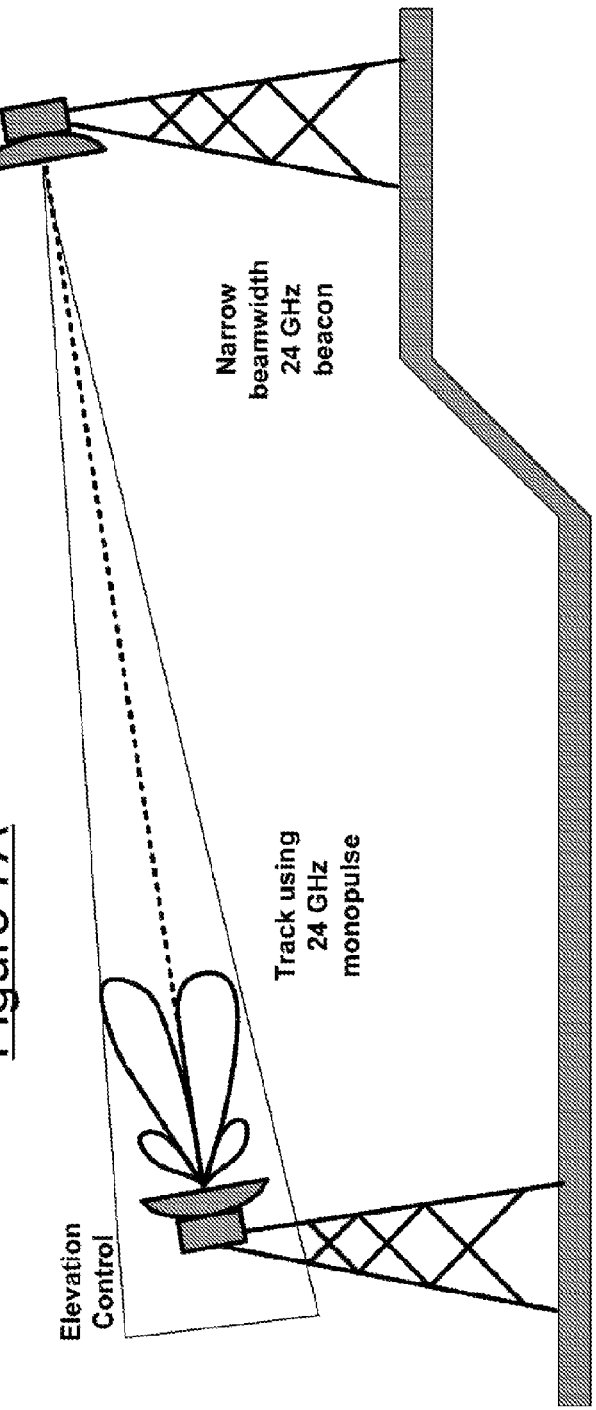

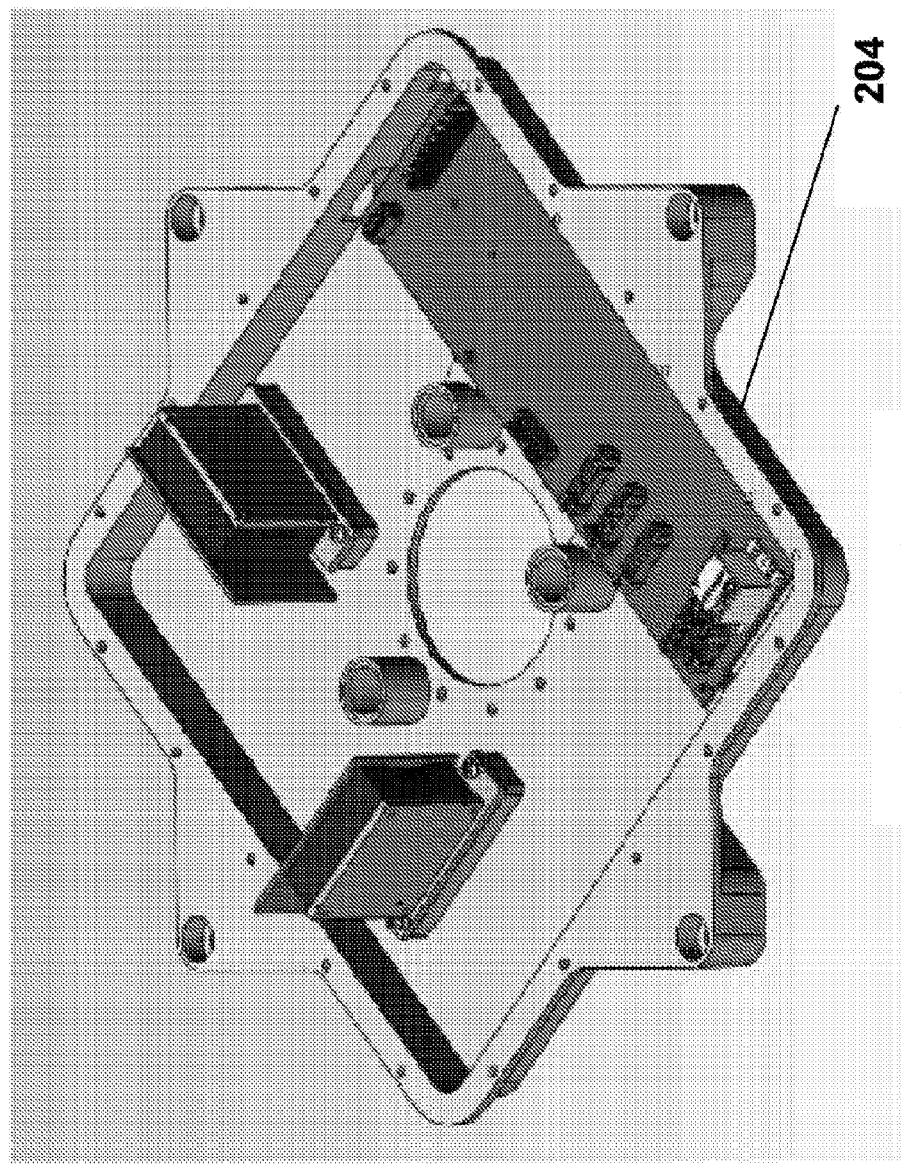

STABILIZED PLATFORM FOR A WIRELESS COMMUNICATION LINK

TECHNICAL FIELD

The present invention is directed to an apparatus and method for establishing and maintaining alignment between directional antennas of a terrestrial communications link.

BACKGROUND

Any references in the following discussion to methods, apparatus or documents of the prior art are not to be taken as constituting any evidence or admission that they formed, or form part of the common general knowledge.

Millimeter-wave radio communications apparatus enables the wireless transmission of high speed data between two points. Such apparatus has become an increasingly common method for backhaul of data from cellular networks to a fiber backbone.

U.S. Pat. No. 6,016,313 describes multiplexing a plurality of mm-wave antenna arrays to support transport in such a cellular network. In U.S. Pat. Nos. 6,714,800, 7,062,293, 7,769,347, and 7,912,506 the use of multiple mm-wave radios to assemble networks for cellular backhaul are disclosed. The systems described in these patents rely on the key advantages of mm-wave propagation: large bandwidth, which supports high data rates; and narrow beamwidth, which supports multiple nodes operating from the one site since mutual interference of the radio waves is low. U.S. Pat. No. 7,065,326 describes a mm-wave system with a particular modulation circuit whose half power beam width is about 0.2 degrees or less.

Although mm-wave communications systems can support gigabit-per-second data throughput, they have a susceptibility to atmospheric attenuation which limits communications distances to lengths of no more than several miles, and only in good weather. In U.S. Pat. Nos. 6,556,836 and 6,665,546 there are described gigabit-per-second communications at 95 GHz. However these systems require use of a lower frequency backup transceiver in the event of adverse weather. U.S. Pat. Nos. 6,169,910 and 8,090,411 and international patent publications WO 2013058673 and WO 2014011087 describe mm-wave systems using special dielectric lens antennas, or multiple feed arrays or switchable focal plane arrays used for electronic beam steering to improve communications and achieve alignment under such conditions.

However, as some of these patents describe, the narrow beamwidth at mm-wave frequencies also creates difficulty in correctly aligning two ends of a terrestrial link that are separated by large distances, since the antennas need to point directly at each other to avoid missing each other's narrowly focused beams. U.S. Pat. No. 6,587,699 describes using an optical alignment method to align antennas at either end of a terrestrial link. U.S. Pat. No. 6,611,696 claims an alignment method requiring two installers at each end who initially align the antennas visually, and then use the strength of a transmitted tone to manually fine-tune the alignment.

U.S. Pat. No. 7,680,516 claims an automatic alignment technique in which the antenna is mounted on gimbals, but whose positioning data is obtained from GPS signals and must be shared between the two ends. U.S. Pat. No. 6,307,523 B1 describes an automatic tracking technique specifically for two-way communications with a skyborne target in which a sub-reflector is required in the main path to modulate the main received signal to generate a tracking signal through which the pointing direction may be controlled.

Digital beam forming techniques may also be adapted to indicate the direction of the incoming mm-wave signal and to point the principal axis of the receiver antenna in the correct direction. US patent publication number 20060246863 and international patent publication WO 2011056256 describe such digital beam forming or beam peaking techniques for communications systems, while U.S. Pat. No. 8,558,746 describes the construction of a flat panel array antenna for frequencies below 26 GHz.

Referring now to FIGS. 1 and 2, there are depicted top plan and side views of a terrestrial communications link established by opposed link ends in the form of microwave frequency transceivers and directional parabolic reflector antennas mounted on respective towers.

As previously alluded to, a problem that arises with a system such as that of FIGS. 1 and 2, which is particularly pronounced where the link operates at millimeter wavelength frequencies, is that it is difficult to maintain mutual alignment of the ends of the link. This problem arises because the operating wavelength is so small that even moderate size antennas (of say 1.2 m diameter) have a very narrow beamwidth, which is typically around 0.25 degree in the E-band (75-85 GHz).

Even if the link is set up correctly initially, with both ends in mutual alignment, a variety of factors may cause the ends to misalign. One reason for misalignment occurring is that the towers at each end may tilt or twist due to wind or other forces. Wind-induced motion at either end of the communications link will cause the center of the transmitted signal beam to completely "miss" the remote antenna, causing lack of any received signal at the remote end and a link outage. Such motion can occur at either, or both, ends of a link.

It will be realized that a link outage is highly undesirable and depending on the nature of the traffic being carried it may have very serious ramifications.

In addition to the above problem, it is presently difficult to "fine tune" an initial somewhat coarse alignment of an end of a terrestrial communication link. It would be advantageous if it were possible to subsequently improve upon an initial alignment.

SUMMARY OF THE INVENTION

According to a first aspect of the present invention there is provided a method for maintaining a first antenna in a desired direction including:
  redirecting the first antenna in response to variations in a beacon signal received at a location proximate or coincident with the first antenna wherein the beacon signal emanates from a remote terrestrial beacon.

Preferably the first antenna is mounted to a redirecting assembly arranged for redirection thereof and the step of redirecting the antenna includes controlling actuators of the redirecting assembly.

In a preferred embodiment of the invention the redirecting assembly comprises a gimbal having first and second axes. For example, the gimbal assembly may have an elevation axis and an azimuth axis.

It is preferred that the first antenna comprises part of a first end of a terrestrial data communication link and said remote beacon is located with a second antenna comprising a second end of the said communication link.

The beacon may be omnidirectional or alternatively it may be directional so that it has an associated signal beamwidth.

Where the beacon is directional the beacon signal beamwidth is typically greater than a beamwidth associated with a data communication signal of the second antenna.

Preferably the beacon signal beamwidth is also sufficiently great to accommodate a range of angular perturbations of the first or second antenna from the desired direction. For example, the range of angular perturbations will typically correspond to those expected due to destabilizing motion of a platform upon which the antenna is mounted. The platform may be a telecommunications tower for example.

The method may include, subsequent to acquiring the beacon signal, a step of narrowing said beamwidth for improved accuracy in redirecting the first antenna.

The method may also include:
  carrying out the step of redirecting the first antenna in response to the beacon signal until the data communication signal is acquired; and
  then redirecting the first antenna in response to variations in the data communication signal.

The step of redirecting the first antenna in response to variations in the beacon signal may involve applying a monopulse process to thereby improve the accuracy with which the first antenna is redirected.

Alternatively, the method may include operating the actuators to mechanically scan for a boresight associated with the beacon signal.

In an alternative embodiment of the invention the beacon signal emanates from a beacon located off the desired direction and the beacon signal is received by a second antenna pointed toward the beacon wherein the second beacon antenna is arranged to move in concert with the first antenna.

According to a further aspect of the present invention there is provided a software or firmware product comprising tangible machine readable instructions for execution by an electronic processor for implementing the previously described method.

According to a further aspect of the present invention there is provided a link end for a terrestrial communications link including:
  a directional antenna;
  a redirecting assembly mounted to the directional antenna;
  one or more actuators coupled to the redirecting assembly;
  a control system arranged to control the redirecting assembly in response to variations in the beacon signal.

In a preferred embodiment of the invention the redirecting assembly comprises a two axis gimbal. Alternatively, other redirecting assemblies are possible. For example, the redirecting assembly might include a tripod with independently actuated variable length legs for providing tilting of the directional antenna.

Preferably the control system includes an azimuth control subassembly in communication with a first actuator of said actuators, wherein the first actuator is arranged to vary an azimuth angle of the gimbal.

Preferably the control system includes an elevation control subassembly in communication with a second actuator of said actuators, wherein the second actuator is arranged to vary an elevation angle of the gimbal.

In a preferred embodiment of the invention the elevation control subassembly includes an inclinometer.

Preferably the control system is arranged to implement a control system including an inner velocity loop and an outer position loop.

It is preferred that the elevation control subassembly and/or the azimuth control subassembly include gyroscopes arranged to sense angular velocity of the antenna.

Preferably the control system is arranged to estimate drift of the gyroscopes and compensate accordingly.

In a preferred embodiment of the invention the link end includes a beacon source. For example, the beacon source may comprise a wireless signal generator and a feed or beacon antenna coupled thereto wherein the feed or beacon antenna is arranged to produce a wider beamwidth than the directional antenna.

Preferably the beacon signal beamwidth is also sufficiently great to accommodate a range of angular perturbations of the first or second antennas from the desired direction.

In a preferred embodiment of the invention the beacon generator is comprised of a K-band signal generator.

It will be realized that the beacon generator comprise signal generators configured to operate in other frequency bands depending on the requirements of the situation.

The control system may include at least one monopulse network.

In a preferred embodiment of the invention the redirection of both first and second antennas is arranged to apply monopulse techniques, allowing redirection of first and second antennas to occur independently and simultaneously.

Alternatively, in a further embodiment of the invention the link end includes a second antenna non-parallel to the directional antenna and arranged to move in concert therewith;
  wherein the control system controls the redirecting assembly in response to variations in the beacon signal as received by the second antenna.

According to a further aspect of the present invention there is provided a terrestrial link including:
  a first link end including a first directional antenna, a first beacon and a first redirecting assembly coupled to the directional antenna; and
  a second link end including a second directional antenna, a second beacon and a second redirecting assembly coupled to the second directional antenna;
  wherein the first directional antenna and the second directional antenna are maintained in mutual alignment by the first redirecting assembly redirecting the first directional antenna in response to a signal from the second beacon and the second redirecting assembly redirecting the second directional antenna in response to a signal from the first beacon.

According to a further aspect of the present invention there is provided a terrestrial data communications wireless link comprising:
  a first data traffic directional antenna of a first end of the link;
  a second data traffic directional antenna of a second end of the link wherein said first antenna and said second antenna point at each other;
  a first beacon signal directional antenna of the first end of the link pointed at a terrestrial beacon transmitter located off a line between said first and second data traffic antennas;
  a second beacon signal directional antenna of the second end of the link pointed at the beacon transmitter;
  a first redirecting assembly of the first end of the link arranged to redirect said first data traffic antenna and said first beacon antenna;

a second redirecting assembly of the second end of the link arranged to redirect said second data traffic antenna and said second beacon antenna;

wherein the first data traffic directional antenna and the second data traffic directional antenna are maintained in mutual alignment by the first redirecting assembly operating in response to a signal from said beacon received by the first said beacon antenna and the second redirecting assembly operating in response to a signal from said beacon received by the second said beacon antenna.

According to a further aspect of the present invention there is provided a method for increasing the operational range of a high frequency wireless data communications module comprising the steps of:
  mounting said communications module to a back face of an interface assembly;
  mounting a front face of the interface assembly to an antenna feed of a platform stabilization assembly to thereby couple the communications module to the antenna feed for receiving and transmitting data signals therefrom;
  wherein the back face of the interface assembly is arranged to mate with coupling formations of the communications module and
wherein the platform stabilization assembly comprises
  a directional antenna;
  a redirecting assembly mounted to the directional antenna;
  one or more actuators coupled to the redirecting assembly;
  a control system arranged to control the redirecting assembly in response to variations in the strength of a terrestrial beacon signal.

Preferably the interface assembly comprises an interface chassis and an interface plate which comprises the back face of the interface assembly, wherein the interface plate is detachable from the interface assembly for substitution of different interface plates having different communication modules mounted thereto.

According to another aspect of the present invention there is provided a method for mounting any one of a plurality of communications modules to a platform stabilization assembly, wherein each of the communications modules is arranged with a different coupling configuration, the method including:
  producing a plurality of interface assemblies, each of said assemblies having a back face arranged to mate with a corresponding one of the plurality of communications modules and a common front face arranged to mate with the platform stabilisation assembly;
  for a selected one of the communications modules, selecting a corresponding one of the interface assemblies;
  mounting the selected communications module to the selected corresponding interface assembly; and
  mounting the interface assembly to the platform stabilisation assembly.

In a preferred embodiment of the invention one or more of the interface assemblies is comprised of an interface plate and an interface chassis for attachment thereto.

According to another aspect of the present invention there is provided an apparatus for coupling any one of a number of different communications modules to an antenna feed of a platform stabilization system, the apparatus comprising:
  an interface assembly including an interface chassis having a front face arranged to couple to the antenna feed and an interface plate removably fastened to the interface chassis and having a back face arranged to couple to the communications module;
  wherein the interface plate is one of a number of interface plates each having a back face arranged to complement various coupling configurations of the different communications modules According to a further aspect of the present invention there is provided an interface assembly including:
  a back face for coupling to a communications module; and
  a front face arranged for coupling to an antenna feed of a platform stabilization assembly to thereby couple said electronic circuitry thereto and to couple the communications module to the antenna feed for receiving and transmitting data signals therefrom;
  wherein the back face is arranged to mate with coupling formations of the communications module.

Preferably the interface assembly comprises an interface chassis arranged to convey platform stabilization signals and an interface plate which comprises the back face of the interface assembly, wherein the interface plate is detachable from the interface assembly for substitution of different interface plates having different communication modules mounted thereto.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 1 and 2 are top plan and side views of a prior art terrestrial communications link implemented by opposed link ends comprising aligned directional antennas and associated transceivers.

FIG. 3AA shows a detailed view of area "A" of FIG. 3A wherein the antenna horn connects to the antenna reflector and associated antenna feed system for coupling signals to and from the radio and pointing system electronics

FIG. 4AA is a block diagram of a generic feedback control loop having position and velocity loops.

FIGS. 5 to 8 illustrate a terrestrial link implemented by opposed link ends according to the preferred embodiment of the present invention in operation.

FIG. 12 is a view of a front face, i.e. the stabilization side face, of the interface plate of the interface assembly of FIGS. 10 and 11.

DETAILED DESCRIPTION OF PREFERRED EMBODIMENTS

Figure 3A:
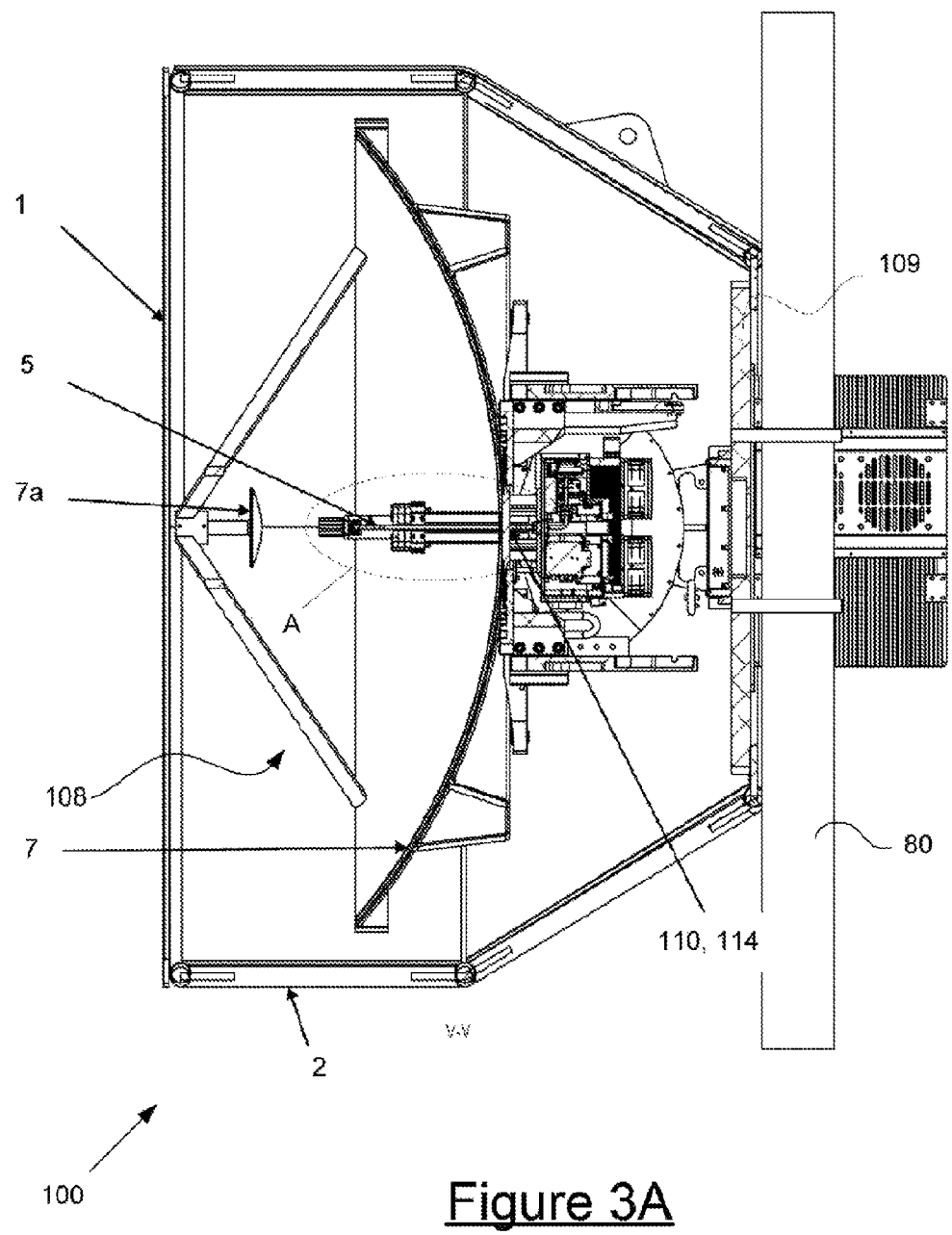
FIG. 3A is an exploded view of a link end including a gimbal and actuators for redirecting an antenna thereof according to a preferred embodiment of the present invention.
Figure 3B:
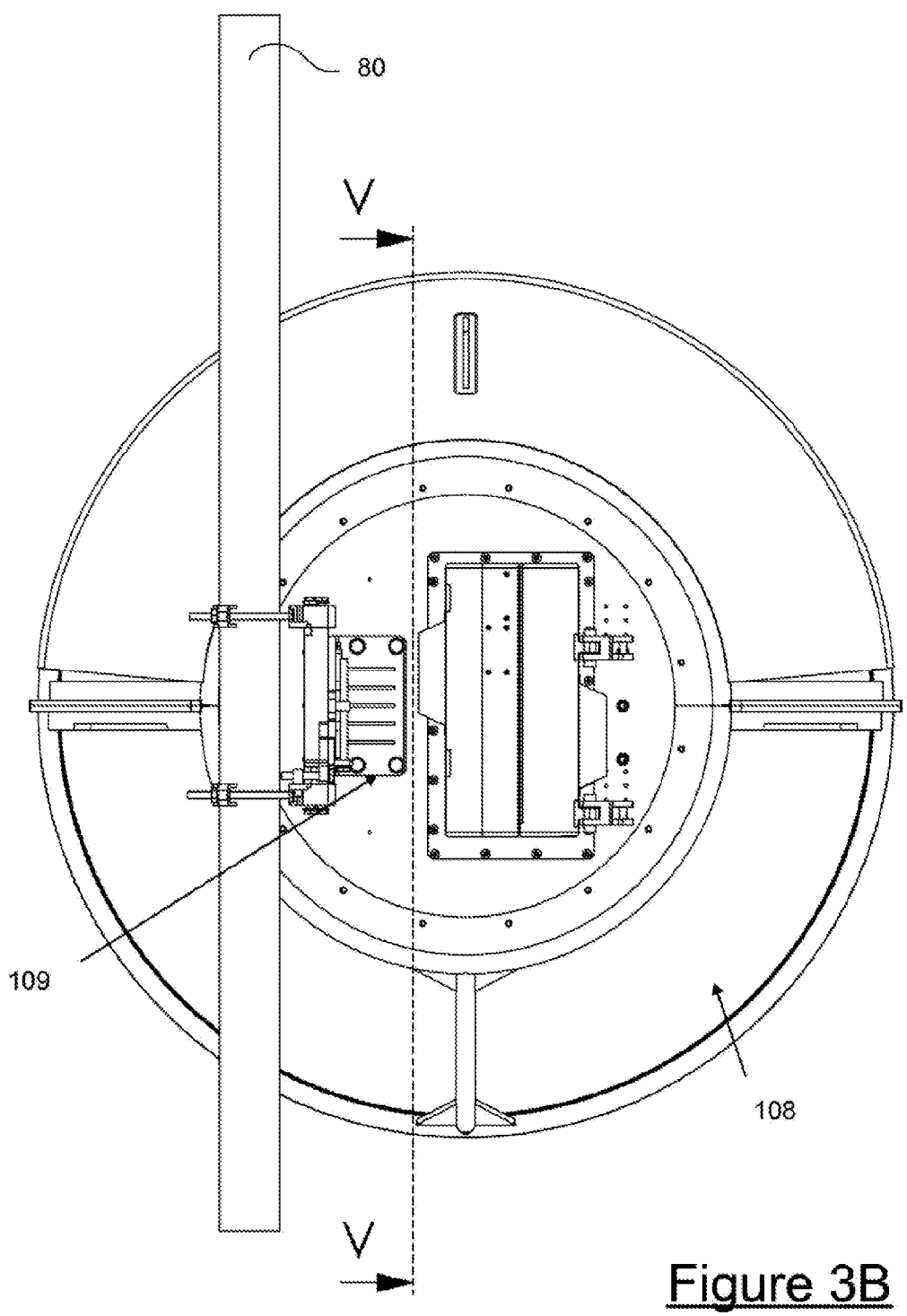
FIG. 3B is a view of how the stabilised platform can be attached to a post of a tower.

Referring now to FIGS. 3A to 3E, there is depicted an antenna assembly or "link end" 100 according to a preferred embodiment of the present invention. As will be explained, the link end 100 includes a redirecting assembly in the form of a two axis gimbal 3 that has x and y pivots 104, 106. One side of the gimbal 3 comprises a gimbal platform 109 that is fastened to a support post 80 which forms part of a support structure such as a radio communications tower. An opposite side of the gimbal includes an antenna support 107 to which an antenna assembly 108 is mounted. The antenna assembly 108 includes an antenna feed 5, sub-reflector 7a and reflector 7. The reflector 7 comprises a directional antenna. Actuators in the form of controllable motors 4b and 4d (shown schematically in FIG. 4C) are built inside the pivot points 104 and 106 to cause the portions of the gimbal that are pivotally interconnected to swing about the pivots. Accordingly, since the gimbal platform 109 is held fast with the support post, the pointing direction of the antenna support 107, and hence the antenna assembly 108 mounted thereto, can be pivoted about the axes of the x and y pivots relative to the platform mounting plate 109.

A shroud 2 is provided that is fast with the gimbal platform 109 and a radome 1 is fastened to the shroud The present example, which is illustrated in FIGS. 3A-3B and 4A-4D, has been designed to meet the following requirements:

| | |
|---|---|
| Pointing error | <0.05 degrees (more generally, about 0.25 of the beamwidth) |
| Acquisition range | >7 degrees |
| Tracking fade margin | >link fade margin |
| degradation of E-band link performance | Minimal |
| Short acquisition time | 10's of seconds |
| Wind speeds | >100 km/hour |

The relevant parameters of a support tower to which the link end 100 of FIGS. 3A to 3E is mounted are assumed to be as follows:

Oscillations are likely to be less than 2 Hertz

Tilt and twist are likely to be less than 2 degrees (except for monopole towers)

Monopole towers can develop larger tilts (e.g., 6 degrees).

The internal components of the link end 100, including actuators in the form of gimbal elevation and azimuth motors 4b and 4d (FIG. 4C) and associated control circuitry 22 (FIG. 4C), are completely enclosed by the radome 1 and shroud 2. The radome 1 and shroud 2 help to reduce wind loading on the antenna assembly 108 and so allow the use of actuators in the form of the relatively low-torque, direct drive motors 4b, 4d which are mounted inside the pivots 104 and 106. The use of direct drive motors eliminates mechanical backlash, which would otherwise make it difficult to meet the ¼ of beamwidth (e.g. 50 mill-degree) pointing requirement. Complete enclosure of the internal components by the radome 1 and shroud 2 also provides protection from rain, hail and ice build-up.

While the redirecting assembly comprises a two axis gimbal 3 in the presently described preferred embodiment, the redirecting assembly might be otherwise. For example, while far less practical the redirecting assembly might include a tripod with independently actuated telescopic legs for providing tilting of the directional antenna.

FIGS. 4A to 4D comprise a block diagram of the beacon sensing and control processing circuitry of the link end 100. In the presently described preferred embodiment of the invention, some of the control processing circuitry of FIGS. 4A to 4D is included within the radome 1 and shroud 2 of FIG. 3, and some is mounted directly behind. However, it will be realised that in other embodiments the electronic control circuitry might be housed at a separate location.

More specifically, FIGS. 4A to 4D depict one end (the "near-end") of a terrestrial link, for example a link similar to link 120 (FIG. 4E) that communicates with a second identical system at the "remote-end". Optimum performance is achieved between the two ends when the antenna assemblies at both ends point directly at each other so that they maximise the corresponding received E-band data signal strength at both ends.

The antenna assembly 108 comprising the main reflector 7, 7-horn antenna feed 5, and sub-reflector 7a operates to transmit and receive a main data signal (at E-band in this instance) to and from the remote end, and to receive a beacon signal (in the implementation of FIG. 4E or 4F), while the gimbal 3 is driven by motors 4b, 4d to cause pivoting about pivots 104, 106 and so steer the antenna assembly 108 to maintain optimum pointing to the remote end, by compensating for relative motion between the ends. The E-band signal is received and delivered from and to the antenna assembly 108 by an E-band feed assembly 110 (FIGS. 3AA and 4D). The E-band feed assembly 110 also generates an E-band monopulse difference signal in the elevation plane, by sensing the signal across two slots 110a, 110b in the horn symmetrically placed in the elevation axis on either side of the main E-band input 112 at the center of the feed.

Coincident with the boresight of the feed 5 is a K-band feed sub assembly 114 (FIGS. 3AA and 4D). Using pairs of slots 114a, 114b, 114c, 114d on either side of the main E-band boresight 112, the K-band feed sub-assembly 114 generates a sum signal as well as difference signals in both the elevation and azimuthal planes from the received beacon signal that is transmitted from the far end K-band beacon transmitter. The K-band feed sub assembly 114 can also be used to transmit a narrow-beam K-band beacon signal towards the far end.

Beacon transmitter signals at the near end are generated by two K-band beacon oscillators 8a (FIG. 4D) and 8b (FIG. 4B) operating at slightly different frequencies, phase locked to a 100 MHz reference signal. Output from the first beacon oscillator 8a is fed to a small, wide beam-width beacon antenna 6 that is used only for transmitting a beacon signal. The transmit beacon antenna 6, is, in the present embodiment, is proximate with the antenna assembly 108. In other embodiments the transmit beacon antenna 6 may be a considerable distance away from the antenna assembly 108. In that case the remote end receiver firmware may need to include instructions for the remote link end to take into account the directional offset between the transmit beacon antenna position and the position of the main (E-band) data transmitter direction. Because of its wide beam width, it is assumed that the transmit beacon antenna 6 will always illuminate the remote end antenna, even when near-end transmitter motion is severe.

Figure 4A:
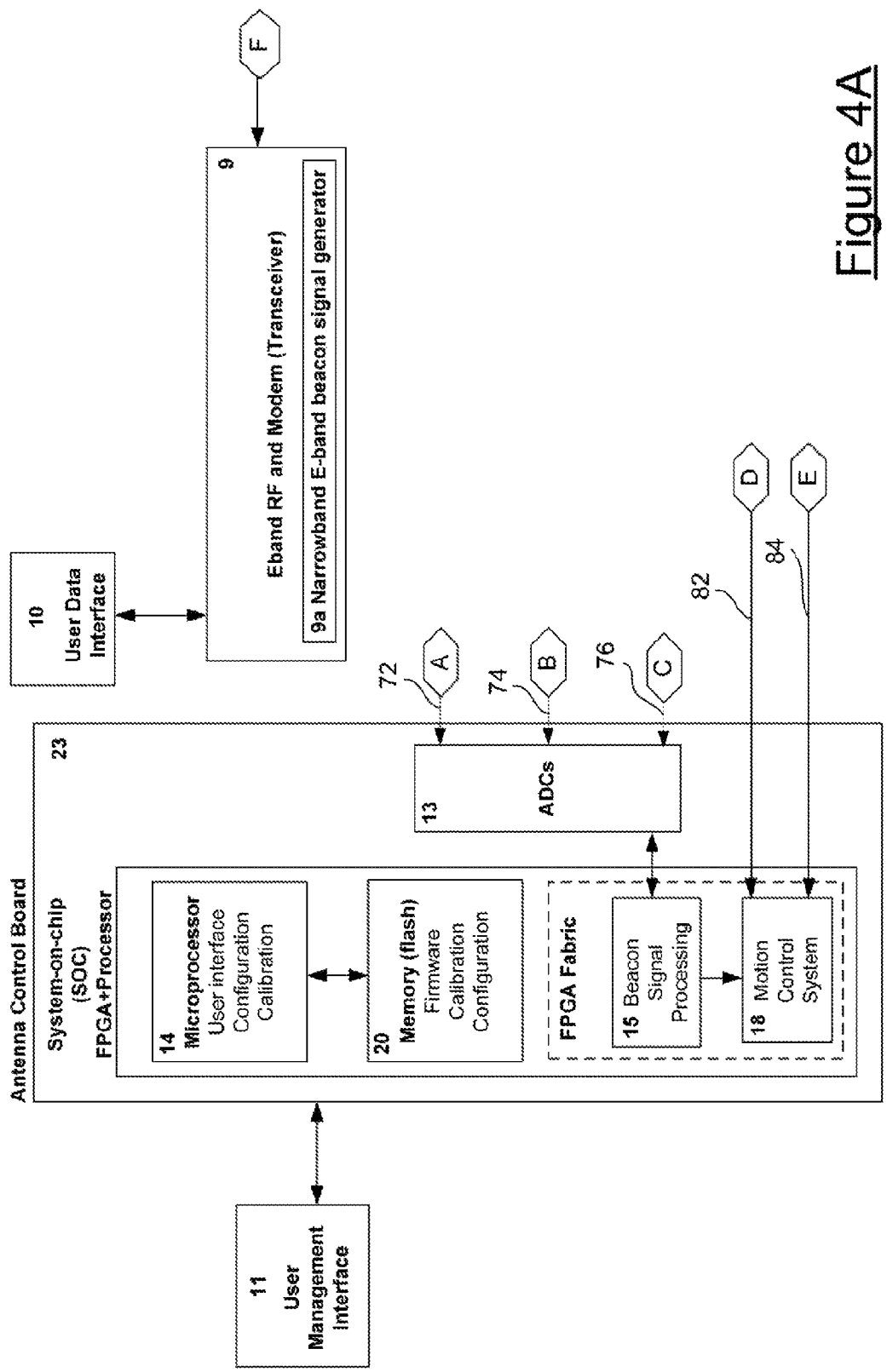
FIGS. 4A to 4D are block diagrams of a redirection motion control system according to a preferred embodiment of the invention which comprises a portion of the link end of FIG. 2.
Figure 4A:
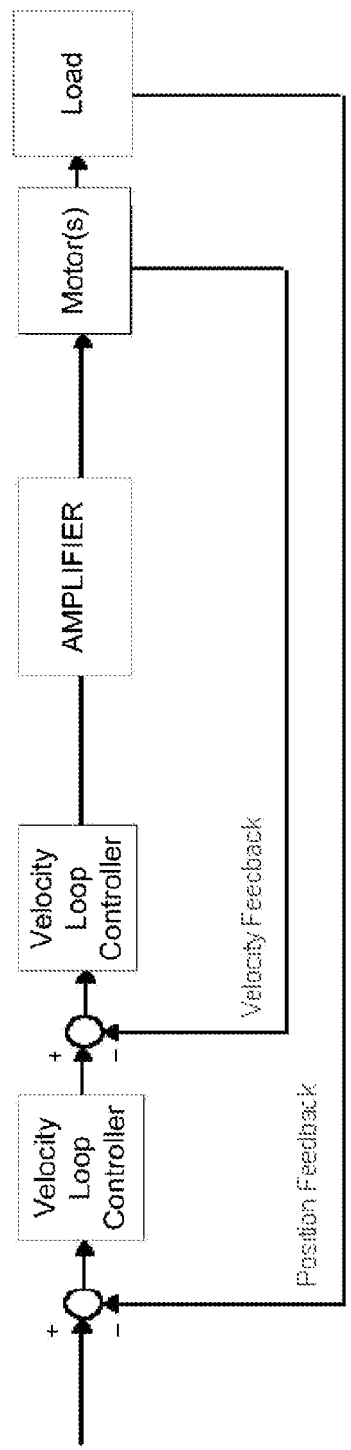
Figure 4B:
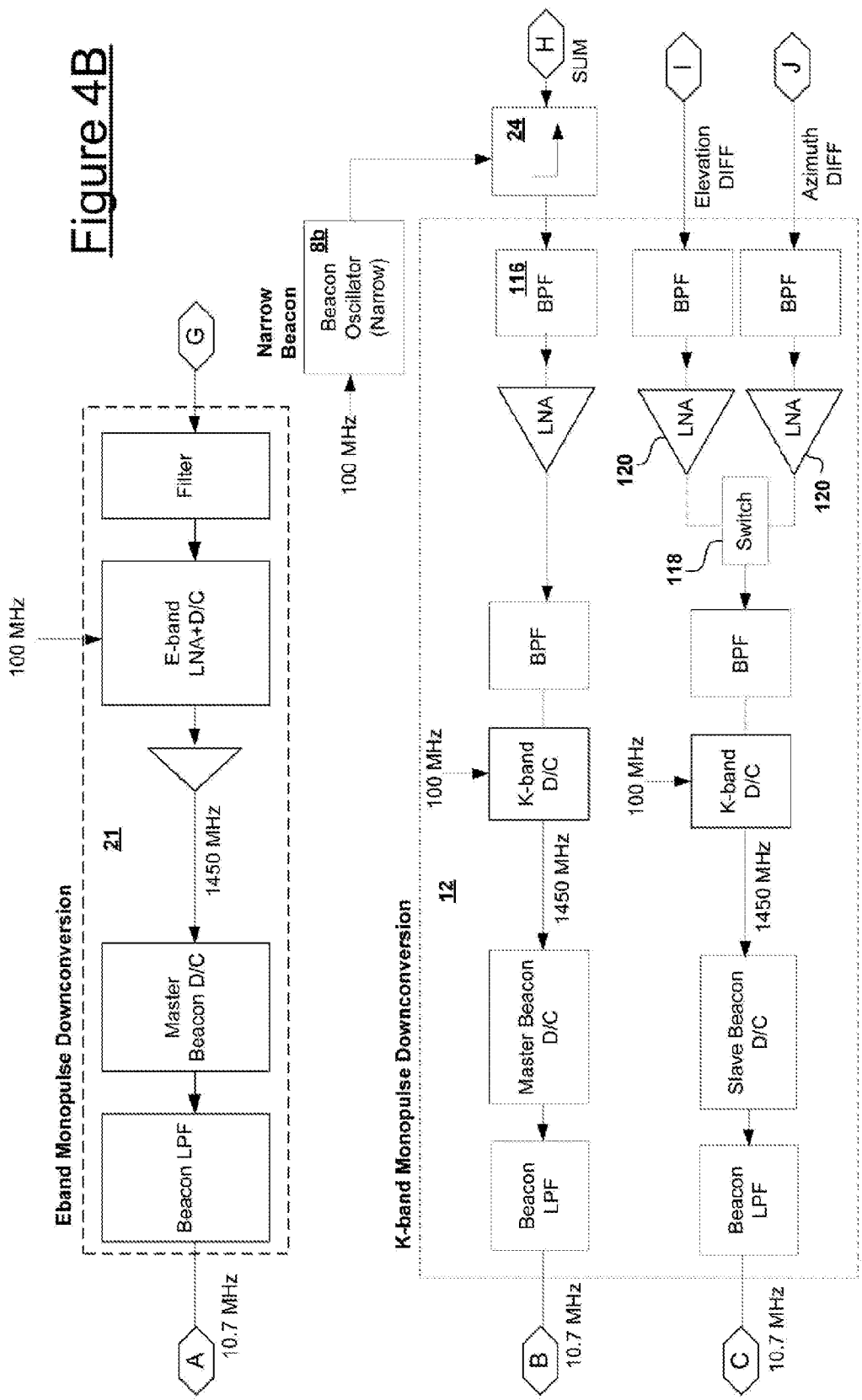
Figure 4C:
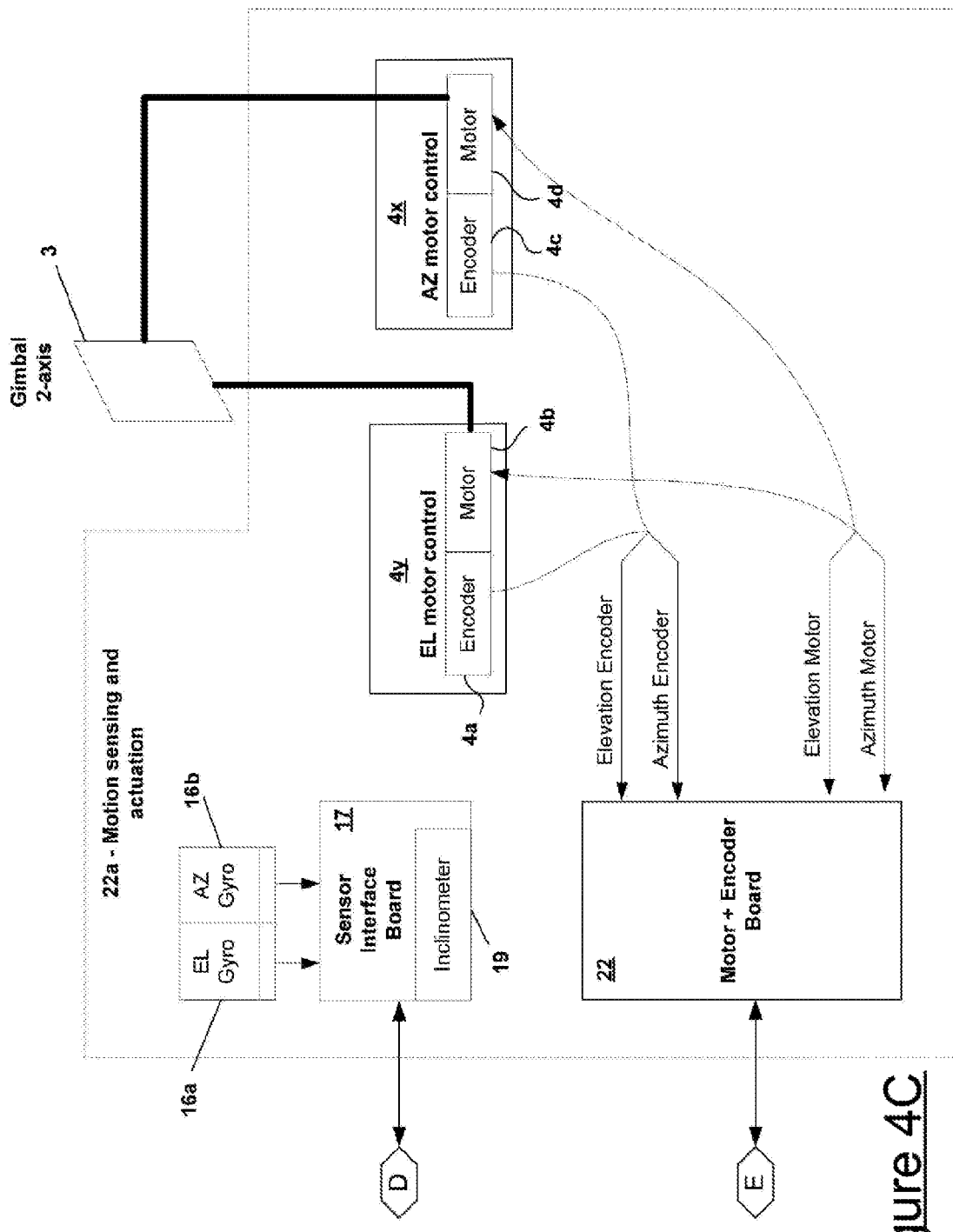
Figure 4D:
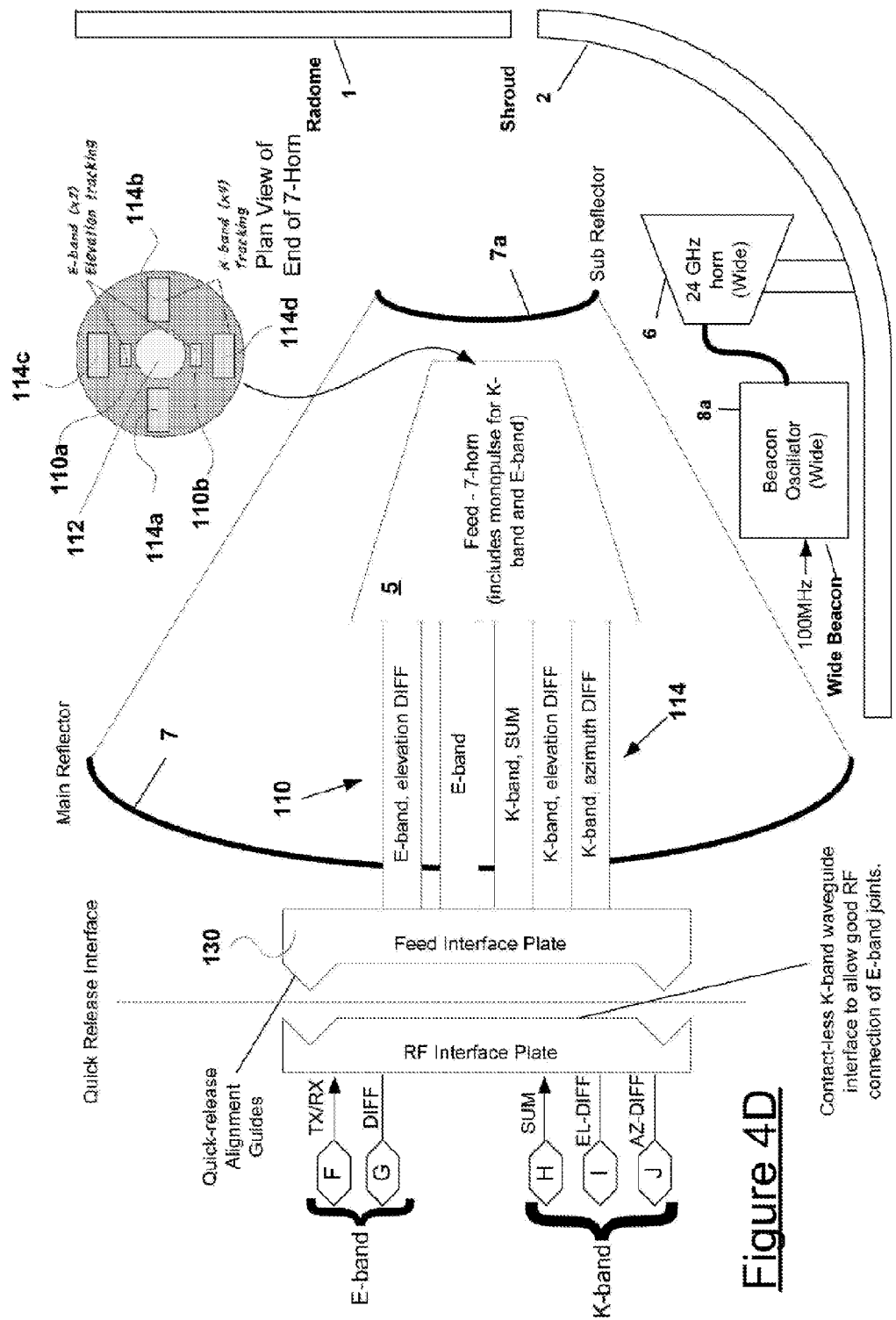
Figure 4E:
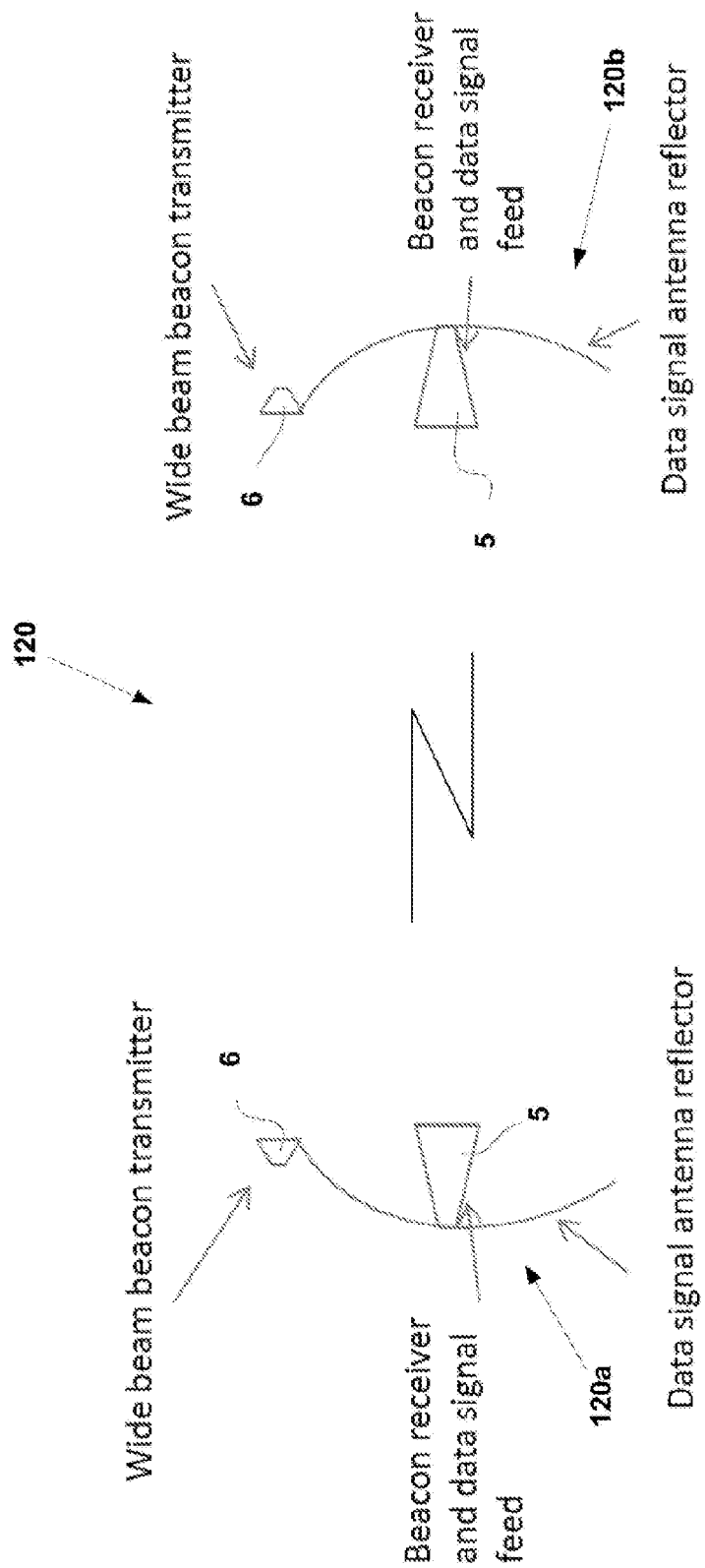
FIG. 4E shows the two ends of a digital communications link, for the case of a proximate beacon transmitter at each end that transmits the wide beamwidth beacon signal to the other end.

In the embodiment of FIG. 4D the wideband antenna 6 is mounted to the shroud (which is fixed relative to the tower) whereas in the embodiment of FIG. 4E it is mounted to the directional data signal antenna, which corresponds to main reflector 7 of FIG. 4D. Both scenarios are feasible because of the wide beamwidth of the beacon antenna 6 however it is preferable to mount it to the shroud so as not to disrupt the main reflector's transmission pattern.

Signal from the second beacon oscillator 8b (FIG. 4B) is transmitted through the narrower beam-width K-band feed subassembly 114 that is integrated with the main E-band feed subassembly 110 into antenna feed 5 and is coincident therewith. Because the narrow beam signal from the second beacon oscillator 8b reflects, via sub-reflector 7a off the much larger main reflector 7, it has a much narrower beam-width. The narrower beamwidth reduces the possible range of acquisition angles at the remote end, and may be useful to reduce possible multi-path signal propagation of the beacon causing misleading pointing angles. However, this transmitted beacon signal is therefore more sensitive to near-end tower motion, so may not always illuminate the remote end. The choice of which beacon signal to use for tracking—narrow beam or wide beam—is made in the antenna control board 23 in accordance with the instructions comprising firmware stored in the electronic memory on that board.

The main E-band data signal is processed in the standard way through an E-band transceiver 9 (FIG. 4A). On the receive side, the RF signal is amplified in the transceiver and downconverted before passing to the modem that detects the digital modulation and sends the received data stream externally via a User Data Interface 10 such as an Ethernet fibre optic interface. On transmit, the transceiver 9 modulates the incoming data stream onto an IF signal in the modem, which is then upconverted, linearised, and amplified prior to transmission via antenna assembly 108. The same modem also sends and receives data from the User Management Interface 11 that can be passed along the link to provide an indication of near end pointing status and other control information useful for network operations.

The K-band beacon receiver feed 114 (FIG. 4D) is coincident with the bore-sight of the E-band data feed 112. It is straightforward to combine the E-band horn and the K-band receiver antenna into a single waveguide horn 5, by incorporating a few extra slots and couplers into the main feed. The received K-band monopulse sum and difference signals are downconverted in phase matched downconvertors 12 (FIG. 4B). These K-band downconvertor channels receive the RF signals from the antenna feed 114 and in the standard way downconvert the received signal to a second IF frequency of 10.7 MHz where they are digitised by A/D convertors 13 (FIG. 4A) on the Interface board. The downconversion circuitry (FIG. 4B) implements the standard functions of band pass filtering (BPF), low noise amplification (LNA), downconverting (DC) to a first IF of 1450 MHz in a mixer phase locked to a 100 MHz reference source, and final low pass filtering (LPF). The K-band sum channel includes a directional coupler 24 (FIG. 4B) in its path prior to the first band pass filter 116, since the beacon sum port on the narrow beam antenna feed 114 is also used to transmit the beacon as well as to receive it. The difference channels include a switch 118 after the low noise amplifiers 120 since the processing of the azimuth and elevation beacon signals are identical, so the analog hardware can be time shared to save costs.

The received signal tracking information from the E-band monopulse downconversion module 21 and the K-band monopulse downconversion module 12 is passed through analog to digital converters 13 and then processed by microprocessor 14 (FIG. 4A) and FPGA 15 (FIG. 4A). The FPGA 18 implements a motion control system and outputs a monopulse pointing error vector signal on line 84. The vector signal indicates the deviation in elevation and azimuth from true bore-sight. When a required change in position is indicated by the monopulse tracking information on lines 72, 74, 76, the motors 4b, 4d are driven in both azimuth and elevation by the motor control board 22. The motor control board 22 operates in response to the monopulse pointing error vector signal from the motion control system 18, until the measured error vector is reduced to zero.

The gimbal control circuitry 22a contains gyroscopes 16a, 16b, which are oriented along the axes of the two pivots 104, 106, to sense the overall motion of the near end antenna. Such motion may be intentional due to the motors, or due to external effects such as wind or temperature. Signals from the gyroscopes 16a, 16b are sensed in an interface board 17 and fed back to motion control system 18 on line 82 (FIG. 4A) for use in a feedback system, implemented in the firmware executed by microprocessor 14 and FPGA 18, to correct for unwanted motion. Similarly, the inclinometer 19 provides current elevation angle information, and this can be used upon system initiation, or to provide additional data if multipath or other unwanted signal effects are suspected of corrupting the monopulse tracking data.

The instructions comprising the firmware in memory 20 that is used to process the monopulse data and sensor data, implement both a velocity and position loop. User adjustments and the current state of the microprocessor can be controlled through a User Management Interface 11 such as Ethernet. The firmware and data are loaded into the FPGA and microprocessor from flash memory 20, and stored locally.

To achieve higher pointing accuracy once the main signal has been acquired and the antennas of the near and remote link ends are pointing close to bore-sight, the firmware may include instructions for the narrower beam width of the received E-band signal to be used independently of the beacon signals to provide pointing information for fine-tuning. The E-band signal can more accurately track the main signal propagation axis because it has very narrow beam width, due to its high frequency and the large size of the main reflector 7.

For simplicity, only directional information from the elevation axis is shown in the processing of FIGS. 4A to 4D.

A narrowband E-band beacon signal generator 9a provided within transceiver 9 to produce a narrowband E-band beacon signal as a separate channel within the main E-band data signal for transmission to the remote end. The narrowband E-band beacon signal from the generator 9a is coupled into the same transceiver 9 and feed system 5 as the main data signal itself. At the near end, a received E-band beacon monopulse difference signal is generated in the elevation plane by the slots 110a, 110b at the antenna horn 5. This is processed by the monopulse E-band feed network 21 (FIG. 4B), which is a standard RF down-convertor chain consisting of standard RF blocks tuned to the E-band beacon frequency to provide signal filtering, low noise amplification, dual downconversion, and final filtering at a second IF frequency of 10.7 MHz. The main E-band data signal is coupled from the E-band transceiver 9 and provides the equivalent monopulse "sum" signal.

Together, the E-band "sum" and "difference" monopulse signals are processed in the FPGA fabric 15 to generate a pointing error signal on line 84 that is derived from the E-band propagation path. The absence of a phase reference on the monopulse sum port requires the antenna to be mechanically scanned either up or down to ascertain the desired direction of movement. The E-band propagation path is the more important data-bearing path, but because of its narrow beam width and susceptibility to path loss, is often difficult or impossible to detect without a more robust and broader beam width K-band beacon signal to first acquire the remote end. This assumes that the K-band and E-band propagation paths are essentially identical.

Where necessary, mechanical scanning of the antenna to first acquire the initial beacon signal is performed in accordance with instructions executed by the firmware in memory 20 running in the microprocessor 14. These instructions cause the antenna to move along a grid pattern over the full range of motion of the gimbal 3 until a peak in received signal strength is detected. The inclinometer 19 (FIG. 4C) can be used to set the initial elevation angle in the search. Once the beacon is detected, mechanical scanning ceases and the K-band beacon and ultimately E-band beacon monopulse tracking are used to accurately point the system. The hardware illustrated in FIGS. 4A to 4D executes a firmware product that is stored in a memory 20 accessible to (or onboard) the microprocessor 14 and field programmable gate array (FPGA) 15.

To reiterate, the instructions coded into the firmware enable the microprocessor and FPGA to implement the redirection procedures that are described herein according to preferred embodiments of the present invention.

The commands to drive the motors 4b, 4d are issued through the motion control system 18 (FIG. 4A) to the motor and encoder board 22 (FIG. 4C). Feedback on movement and acceleration is again provided from the gyroscope sensors 16a, 16b, and on actual position from the position encoders 4a, 4c, through the motor and encoder board 22.

Each axis control for the gimbal 3 has a tightly integrated motor 4b, 4d, encoder 4a, 4c and MEMS gyro 16a, 16b. An inclinometer 19 is also included to help with elevation control during acquisition.

The control system uses pointing error estimates and the gyros 16a, 16b to keep the antenna 108 pointing directly at the other end of the link. It uses a two-loop configuration The instructions coded into the firmware that is stored in the digital memory 20 implement a fast inner "velocity" loop, and a slower outer "position" loop which is well known in the industry to be robust. A generic feedback control system using a fast inner velocity loop and a slower outer position loop is illustrated in FIG. 4AA.

The velocity loop is the innermost and fastest of the control loops, having a loop bandwidth of approximately 30 Hz. Its function is to keep the angular velocity of the antenna 108 constant, normally zero. The gyros 16a, 16b are used to sense the actual angular velocity, and the motors 4b, 4d are driven to correct any non-zero angular velocity.

The gyros 16a, 16b cannot be used to maintain pointing indefinitely, as they have small offsets that make their velocity estimate non-zero (but small) when the actual angular velocity is zero. Motion control system 18 estimates the drift over time and applies a bias signal via line 82 to the sensor interface board 17 to cancel the drift.

The position loop's function is to use pointing error estimates to correct for the slow drift of the gyro sensors. The pointing error input for the loop can be derived from any combination of the K-band monopulse signals, the E-band elevation-only monopulse signal, and the encoder signals during the E-band mechanical scan.

The position loop redirects the antenna by applying, a non-zero angular velocity demand to the velocity loop. The position loop bandwidth is approximately 2 Hz.

FIG. 4E shows the two ends 120a, 120b, of a digital communications link 120 according to a preferred embodiment of an aspect of the present invention. Each end 120a and 120b comprises a link end similar to link end 100 that has been previously described. That is, each link end 120a, 120b has a proximate beacon transmitter that transmits a wide beamwidth beacon signal to the other end, as previously discussed with reference to wide beam beacon antenna 6 of FIG. 4D. A separate coincident feed, i.e. a feed such as feed 5 of FIG. 4D, illuminates the large data signal antenna reflector to increase antenna gain and generate a second narrow beamwidth beacon signal. This feed uses a combined K-band and E-band horn along a common bore-sight, and is used for transmitting and receiving all E-band signals, for receiving the K-band beacon signal, and for transmitting the second narrow beamwidth K-band beacon signal. The received beacon signal and data link share the same bore-sight.

Figure 4F:
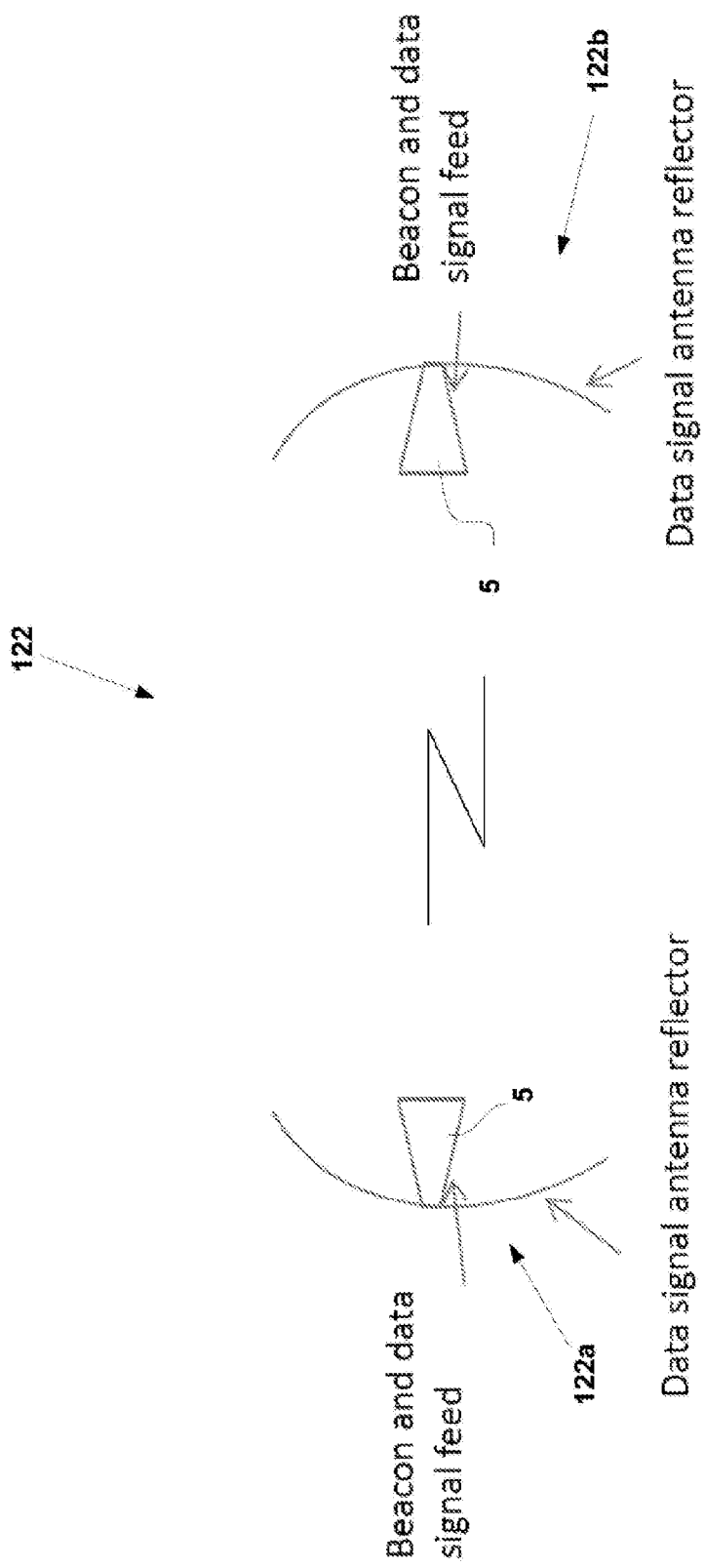
FIG. 4F shows the two ends of a digital communications link, for the case of a coincident beacon transmitter at each end.

FIG. 4F shows a second embodiment for the two ends of a digital communications link 122, for the case of a coincident beacon transmitter at each end. The antenna feed uses a combined K-band and E-band horn, of the type previously discussed with reference to FIG. 4D along a common bore-sight. As well as transmitting and receiving the E-band data signal, it receives and transmits the K-band signal beacon. The wide beamwidth beacon is generated by under illuminating the large reflector at the K-band beacon frequency, reducing the antenna gain. The narrow beamwidth beacon is generated by fully illuminating the large reflector at the beacon frequency, increasing the antenna gain. The received beacon signal and data link share the same bore-sight.

The exemplary link end 100 that has been described is programmed to provide at least three methods of directing the antenna assembly 108, which will be explained. The use of the three methods is intended to cover all contingencies; it will be realised that not all, or any, of the three methods need be implemented in every embodiment of the invention.

In the following description various specific preferred frequency ranges and system parameters are mentioned. It will be realised that the invention is not limited to implementations which make use of these specific frequency ranges and system parameters since other values may be used in other embodiments of the invention as circumstances dictate.

The three exemplary methods, which are discussed for purposes of illustrating specific embodiments of the invention are:
1. Monopulse tracking using a beacon frequency at 24 GHz
2. Mechanical scan at 80 GHz (assisted by gyros and 24 GHz monopulse
3. Elevation-only monopulse at 80 GHz Method 1: 24 GHz Monopulse, 4-Horn The primary tracking method is monopulse tracking at 24 GHz.

Monopulse provides accurate tracking by generating and tracking on a sharp notch in the antenna pattern. The receive signals from four 24 GHz feeds are combined to form three antenna patterns. Adding (combining in phase) the four feeds produces a sum pattern. Subtracting the left and right-hand feeds produces an azimuth difference pattern. The elevation difference pattern is formed by subtracting the upper and lower feeds. The pointing error magnitude is calculated by taking the ratio of signal amplitudes on the difference and sum port. The direction of the pointing error can be calculated from the relative phases of the sum and difference signals.

Monopulse tracking is known in the prior art in relation to radar systems and has proven to be robust. Its inherent insensitivity to amplitude variation is beneficial because it allows one end of the link to track the other end, without being affected by level variations caused by pointing changes at the remote end.

Ideally, monopulse tracking would be operated in the E-band so that, the tracking is performed along the same propagation path as the main communications signal. However manufacturing tolerances make it very difficult to develop an E-band monopulse feed that provides accurate tracking, in both elevation and azimuth, without degrading the communications channel. For this reason it is preferred that the monopulse tracking operates in the license-free 24 GHz band in the presently described exemplary embodiment.

Monopulse operation requires a signal from the far end to track. Each end of the link radiates a CW "beacon" for the other end to track. Use of a CW beacon allows for large amounts of noise rejection (narrowband digital filtering in the receiver), and also can provide good rejection of interference signals from wide bandwidth digital communications systems. Interference between links can be avoided by following a beacon band plan, which assigns different beacon frequencies to links in the vicinity of each other.

The link end according to this embodiment is designed to transmit two 24 GHz beacons; one on a separate wide beamwidth antenna; and one (at a slightly offset frequency from the first) using the full 1200 mm aperture of the data antenna reflector (~0.8 degree beam width). The wide beamwidth antenna is used to assist with acquisition (called Wide Beam Tracking). Once tracking has been acquired, the narrow beam beacon is used to reduce possible effects from multipath (called Narrow Beam Tracking).

The monopulse operation method is as follows:
1. The second antenna adjusts its pointing alignment with respect to the incoming beacon signal from the first antenna to adjust for changes in the angular orientation of the second antenna caused by tower movement of the second antenna.
2. The first antenna adjusts its pointing alignment with respect to the incoming beacon signal from the second antenna to adjust for changes in the angular orientation of the first antenna caused by tower movement of the first antenna.
3. The second antenna also adjusts its pointing alignment with respect to the incoming beacon signal from the first antenna due to path propagation changes between the two antennas.
4. The first antenna also adjusts its pointing alignment with respect to the incoming beacon signal from the second antenna due to path propagation changes between the two antennas.
5. Each antenna acts independently of the other with respect to these angular adjustments and the rate of change of angular adjustment and associated time delays are adjusted such that the antennas do not lock into a "hunting mode" which would then drive the angular motions. The antennas respond to angular movements caused by external factors— they are configured not to mutually generate their own or amplify the externally applied angular movements Method 2: Coordinated Mechanical Scans with Gyro Assist Mechanical scanning (with gyro assist) can be used in those cases where "perfect" 24 GHz pointing is not perfect at E-band frequencies. This may occur in some atmospheric conditions in which beam bending can cause path divergence between the 24 GHz and E-band signals.

The mechanical scan method introduces very small periodic perturbations in the antenna pointing direction. The variations in received signal level of either or both of the beacon and/or the E-band communications signal, during the perturbations, are analysed to estimate the pointing error. The rate at which new estimates of pointing error can be provided is relatively low, as the antenna must be physically moved to produce the pointing perturbations. The pointing error update rate is approximately 1 Hz. Gyros are used to maintain pointing whilst in the mechanical scan mode. New pointing estimates are averaged over time to correct for gyro drift.

Coordination between ends is required in mechanical scan mode. This is because perturbations at the other end of the link will introduce amplitude changes that are indistinguishable from local perturbations in pointing direction. Coordination can be achieved via signalling on the beacon (changing frequency) or through use of GPS derived clocks at both ends of the link.

Method 3: E-Band Elevation-Only Monopulse

An elevation-only, E-band monopulse feed may be included to check whether "fine-tuning" in the elevation plane is necessary to account for possible differences in propagation between 24 GHz and E-band frequencies due to path bending.

The E-band monopulse feed uses two small rectangular apertures to produce an elevation null, and will be used to ensure the antenna is correctly positioned in the elevation plane at E-band (in case the 24 GHz monopulse generates misleading pointing information due to e.g. ducting or multipath causing different propagation paths).

Figure 5A:
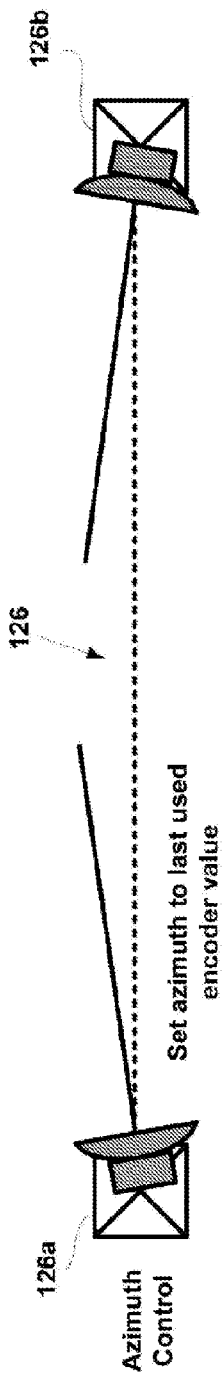
Figure 5B:
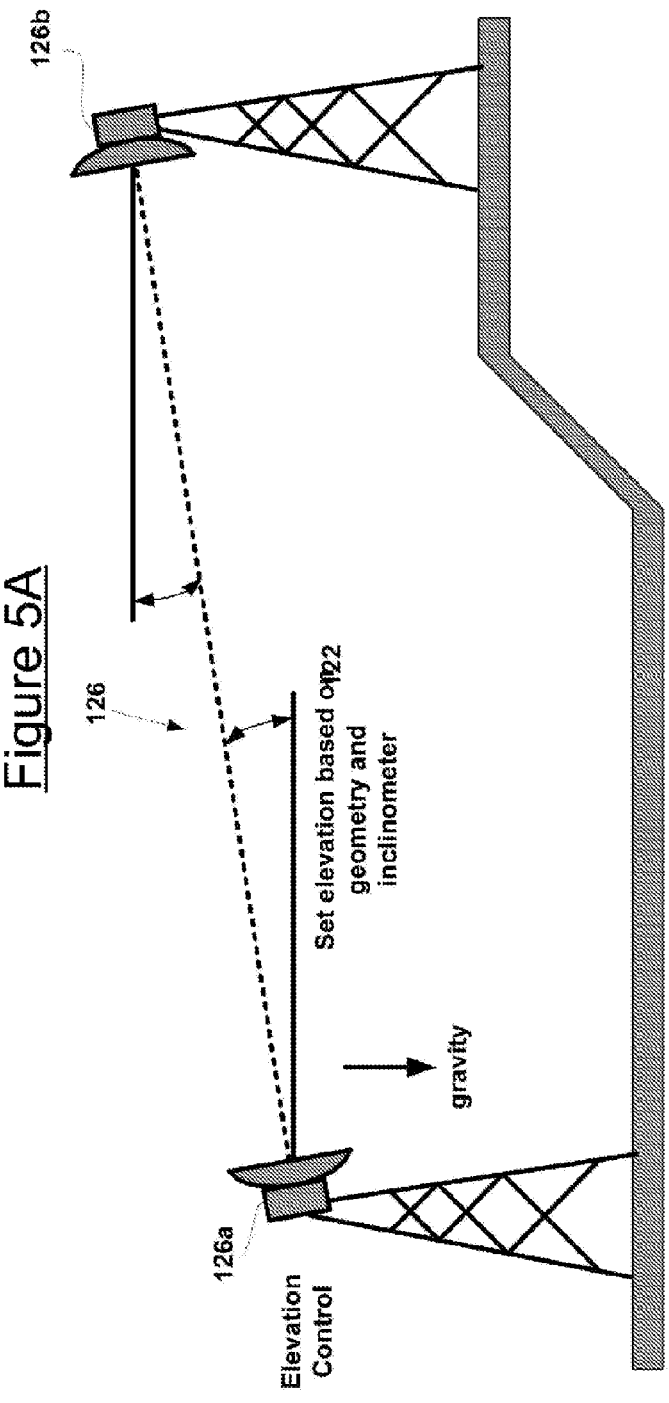
Figure 8:
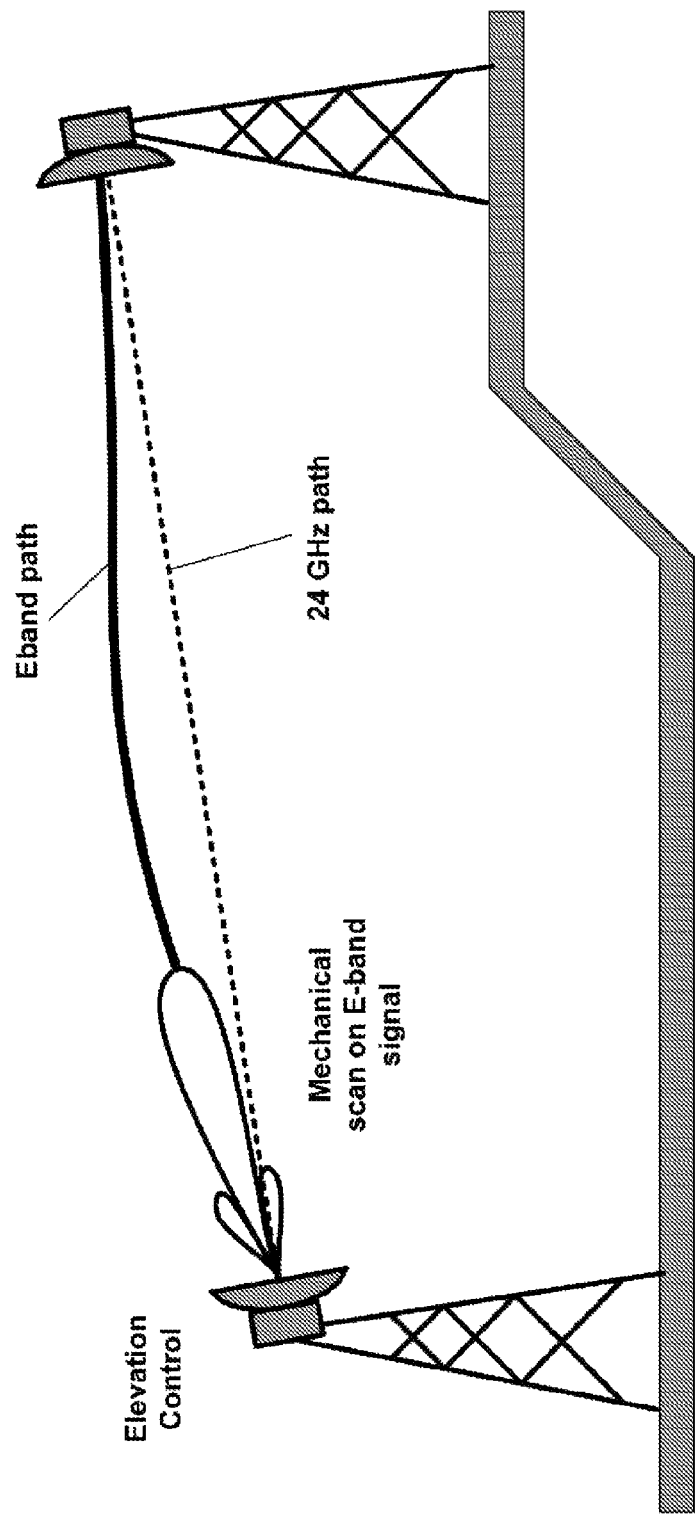
Figure 9:
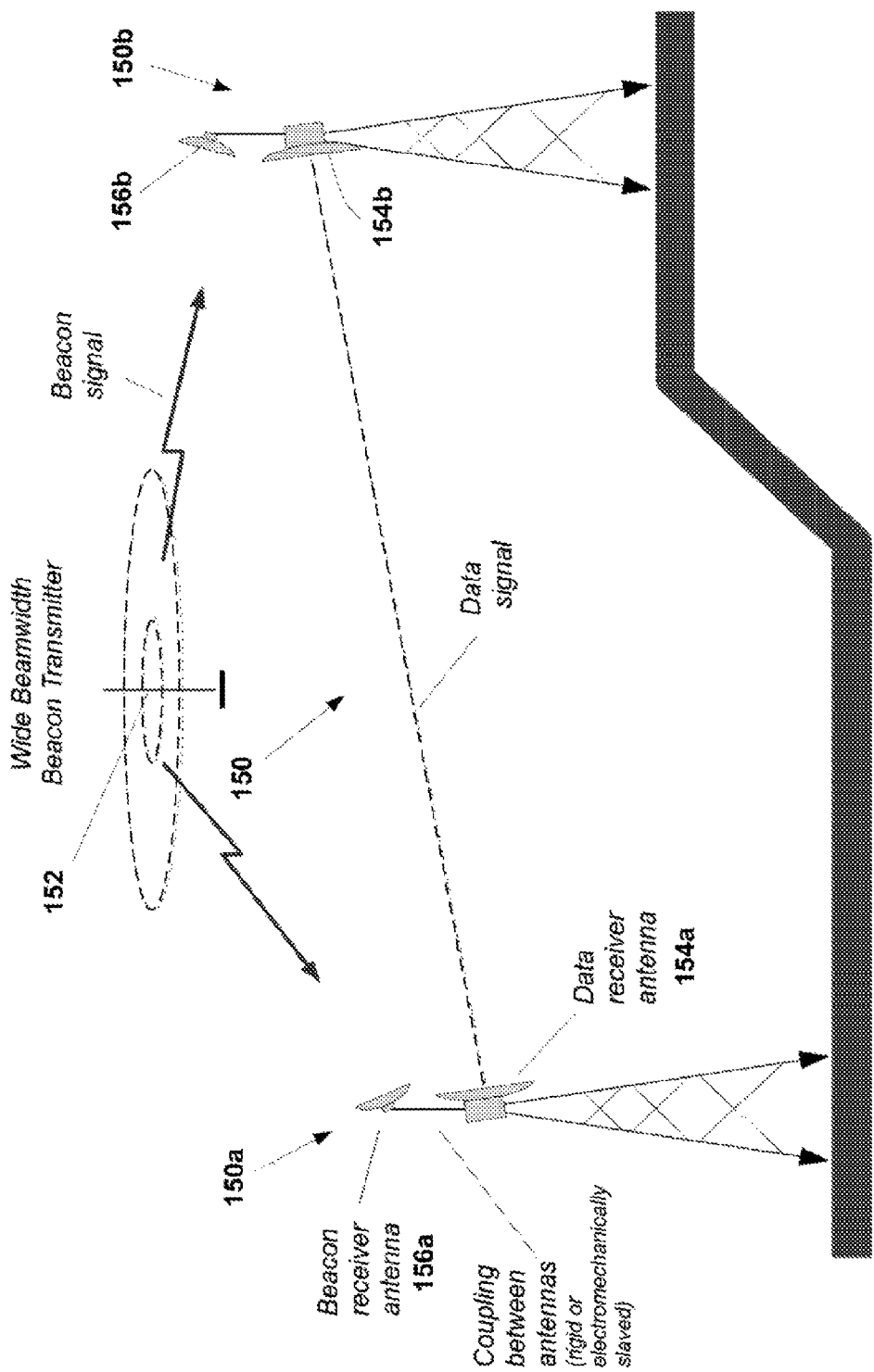
FIG. 9, illustrates a terrestrial communications link according to a further embodiment of the invention wherein the link ends track a common wide beamwidth beacon transmitter that is located a distance off from a line between the two link ends.

Referring now to FIGS. 5A and 5B, in use the ends of the fink 126a, 126b are initially powered up. Each end then executes firmware stored in memory accessible to its Microprocessor+FPGA (FIG. 4A) to proceed through the following steps:

Open Loop Pointing Mode
  I. Set elevation based on inclinometer.
  II. Set azimuth based on last used value from azimuth encoder 4C
  VI. Check/adjust gyro 16a, 16b calibration
  IV. Mechanically scan until wide beam beacon is detected V. Jump to wide beam tracking mode Referring now to FIGS. 6A, 6B, once the wide beamwidth beacon has been detected the system then proceeds to 24 GHz wide beam tracking mode in which it proceeds through the following steps:

24 GHz Wide Beam Tracking Mode
1. Use monopulse to track the wide beamwidth beacon
2. Listen for narrow beamwidth beacon
3. Jump to narrow beam tracking mode
4. If wide beam beacon is lost then return to open loop pointing Referring now to FIGS. 7A and 7B, if the 24 GHz Wide Beam Tracking Mode ends with the narrow beamwidth beacon being detected then the system proceeds through the following steps:

24 GHz Narrow Beam Tracking Mode
   a. Use monopulse to track the narrow beam beacon
   b. Jump to E-band mechanical tracking after successfully tracking for sometime
   c. If wide beam beacon is lost, return to wide beam tracking Referring now to FIG. 8, if the 24 GHz Narrow Beam Tracking Mode ends with successful tracking on the narrow beamwidth beacon then the system proceeds through the following steps:

E-Band Mechanical Tracking Mode
   I. Periodically perturb pointing to confirm E-band pointing
   II. If required adjust pointing to follow E-band signal
   III. If E-band lost then return to narrow beam tracking E-Band Elevation-Only Monopulse Mode
   When the main communications signal is acquired
   I. Use the E-band monopulse subsystem to continue to track the E-band communications signal
   II. If required, adjust elevation of antenna to follow E-band signal
   III. If signal communications is lost, return to wide beam tracking Wide Beamwidth Common Beacon Embodiment Referring now to FIG. 9, there is illustrated a terrestrial communications link 150 according to a further embodiment of the invention. In the embodiment of FIG. 9 a single wide beamwidth beacon transmitter 152 is provided at a location that is off the line of site between the data antennas 154a, 154b of the link ends 150a, 150b. The beacon 152 could be located terrestrially, for example on a tower or high building, or alternatively it could be a satellite beacon in some situations. Each link end is provided with a beacon receiver antenna 156a, 156b that is either rigidly fastened to the data receiver antenna or electromechanically slaved to it so that at each end the beacon receiver antenna and the data receiver antenna move in concert. For example, the 2-axis gimbal shown in FIG. 3A may be arranged to tilt and rotate both the beacon receiver antenna and the data receiver antenna together. The beacon signal from the beacon receiver antenna is processed by circuitry for its link end as shown in FIG. 4A to D.

Using the Platform with a Pre-Existing Radio Apparatus

A preferred embodiment of the previously described stabilized wireless platform requires a monopulse antenna feed structure that senses both the incoming data signal and the direction indicating beacon signal, which typically operates at different frequencies. Thus the antenna feed must receive both signals, and process the beacon frequency to produce both the monopulse sum and difference signals.

The monopulse feed requires three separate connections to extract the direction-indicating signals at the beacon frequency, and a fourth separate connection for the data communications signal itself. Each of these connections has an extremely tight mechanical tolerance to ensure minimum signal leakage between them (which can cause signal corruption), phase matching of the monopulse signals, and environmental integrity.

The beacon signals provide two-dimensional pointing information to the pointing electronics indicating the direction the antenna is currently pointed off its bore-sight. Using this information, the pointing electronics adjusts the direction of the antenna for optimal signal strength in the data communications channel, through the stabilized platform mechanical system described above.

However, in the case of generic, pre-existing E-band radio communications equipment, its pre-existing antenna and antenna feed are neither equipped to generate or sense the beacon pointing signal, nor to provide the appropriate monopulse outputs.

Within the radio communications market there are a large number of vendors that manufacture E-band radio communications equipment incapable of dynamically steering the antenna in the desired direction. These vendors include E-Band, Gigabeam, Aviat, Siae Microelectronic, Huawei and Alcatel. This equipment could benefit from using the techniques previously described. It would be advantageous if such communications equipment could be used with a large antenna, which would increase the equipment's' useful range or allow its use on less stable towers that would normally require dynamic antenna pointing both of which are highly desirable.

It would also be advantageous if it were possible to readily integrate a generic pre-existing piece of communications radio hardware to a system for maintaining alignment of a terrestrial communication link in a straightforward and time efficient manner.

An embodiment of a further aspect of the invention will now be described which provides a replacement antenna and antenna feed interface that can be mounted with the pre-existing piece of communications radio hardware on a stabilized platform. As previously described herein, the stabilized platform includes a direction finding beacon receiver and transmitter.

Consequently, in a preferred embodiment of the invention there is provided an Interface Chassis that is arranged make the desired electrical and mechanical interfaces between the generic radio, the replacement antenna and feed, and the stabilized platform.

The replacement antenna and antenna feed are the same as previously described. They provide the necessary integration of the received beacon electromagnetic signal with the E-band data communication signals, and importantly, permit the direction finding beacon signal to be fed through the new Interface Chassis between the antenna and the radio, into the electronic control system for the stabilised platform, where the desired pointing direction is calculated, while transparently passing through the E-band signal to the radio transceiver.

This facilitates the full benefits of the previously described stabilization techniques for any generic E-band equipment.

In a preferred embodiment of the present invention, the feed of the stabilization system is designed so that it may be simply and efficiently disconnected in the field. This is advantageous in order to implement repairs in practical use.

Within the preferred embodiment previously described, for example with reference to FIGS. 3A to 4D, the module that is mounted on the antenna feed interface is a combined E band communications and pointing chassis, with integrated pointing and data elements. This presents a difficulty if the system is to be used with any third party E band communication system.

Figure 10:
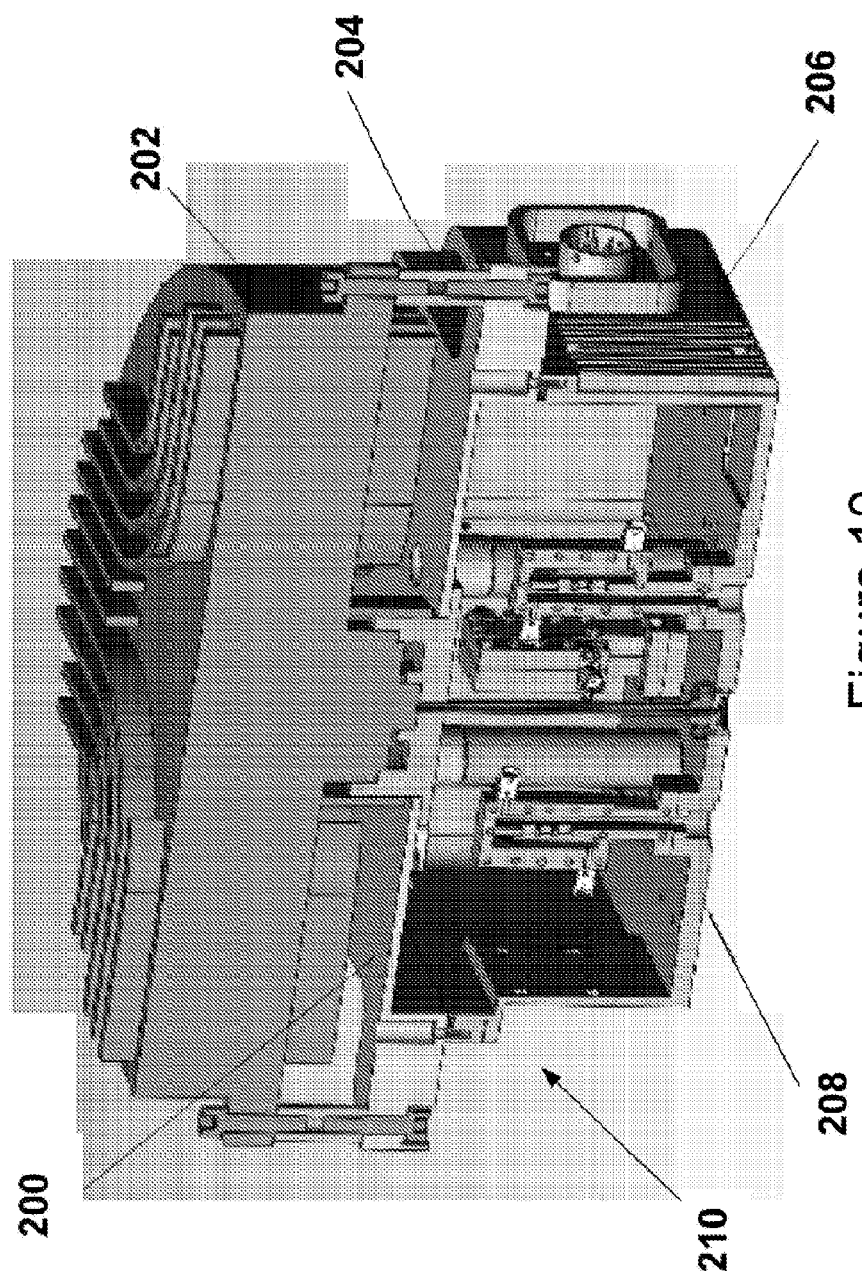
FIG. 10 is a cross sectional view of an interface assembly, according to a preferred embodiment of the present invention, mounted to a piece of generic radio communications equipment, i.e. a radio frequency data transceiver module.
Figure 11:
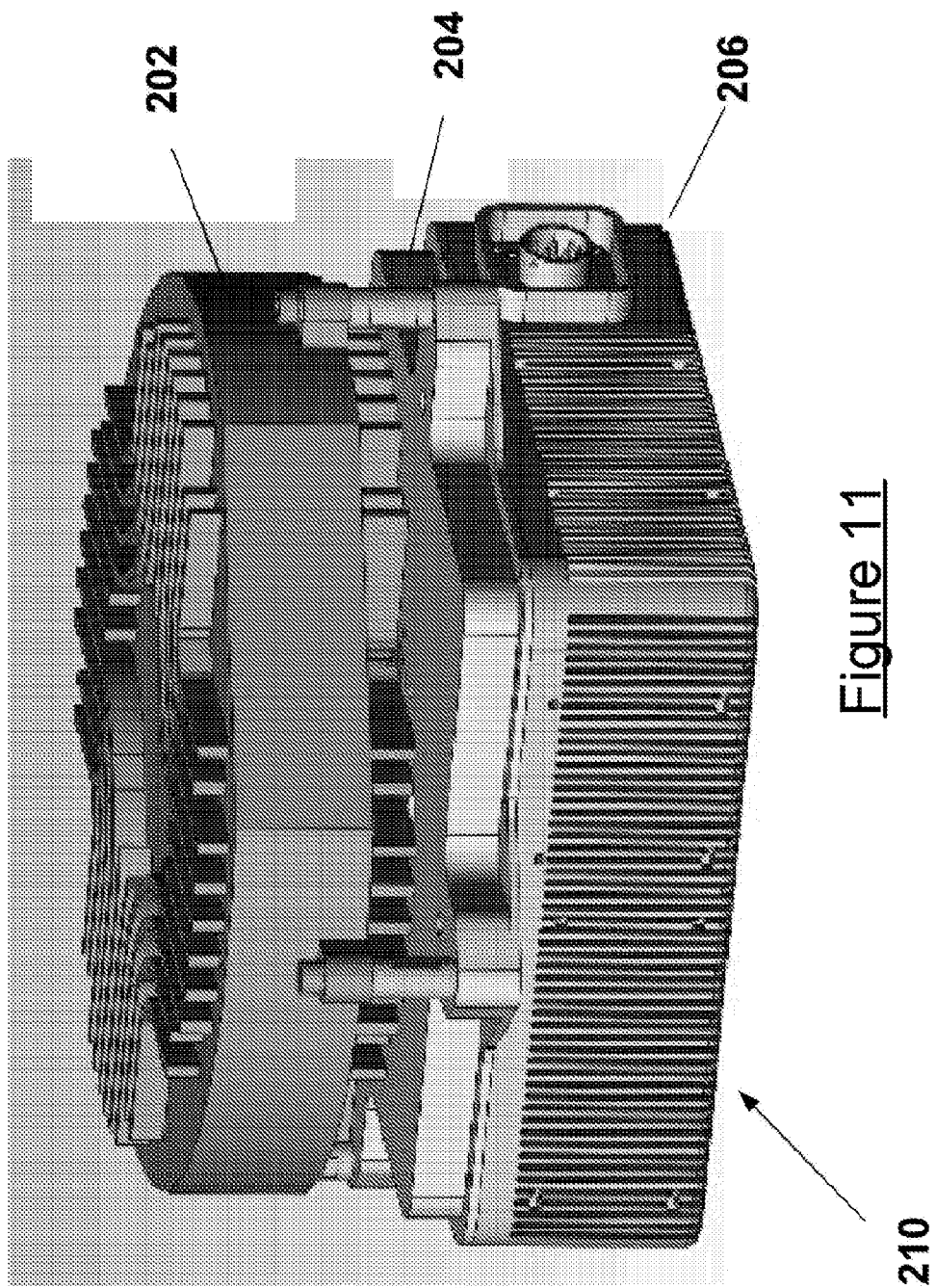
FIG. 11 is a non-cross sectional view corresponding to FIG. 10.

Referring now to FIG. 10 (which is cross sectional) and FIG. 11, there is shown a view of an Interface Assembly 210 according to a preferred embodiment of the invention, in use. FIGS. 10 and 11 show the entire Interface Assembly 210 with the Interface Chassis 206 and the Interface Plate 204 mounted directly to the pre-existing, generic communications equipment 202. The Interface Assembly 210 comprises an Interface Plate 204 that is mounted to an Interface Chassis 206. The Interface Assembly 210 sits between the antenna and its monopulse antenna feed, and a piece of generic radio communications equipment 202. The back face 200 of the Interface Plate 204 is arranged to complement the generic radio communications equipment 202. The Interface Chassis 206 fits onto the antenna feed interface, e.g. the interface plate 130 that is shown in FIGS. 3AA and 4D, directly by attachment of its front plate 208, and splits the monopulse beacon pointing and E-band data communications signals from the combined monopulse beacon/data antenna feed 5 (FIG. 4D) as previously described. The Interface Assembly 210 routes the E-band data communications signal transparently from the feed, through the Interface Chassis 206, to the Interface Plate 204 and thence to the third party generic E band communications system 202.

The Interface Chassis 206 also exports the beacon pointing signals from the antenna feed for connection to the pointing electronics of the stabilized platform. This allows its pointing systems to operate to actively steer the antenna via the gimbal 3 and motors 4b, 4d (FIG. 4D).

The E-band radio communications hardware is now housed in the generic, pre-existing equipment provided by a third party vendor.

The Interface Assembly 210 also includes the Interface Plate 204 which is mounted on the back face of the Interface Chassis 206. The Interface Plate 204 is provided in different versions, each having an outer face 200 individually tailored to accommodate the bespoke interface requirements of a piece of communications equipment from one or more of each of the alternative E-band data communications equipment manufacturers equipments. Such manufacturers include international vendors such as Aviat, Siae and Huawei for example. It is preferred that the interface plate 204 is removable from the Interface Chassis 206 and replaceable thereto even in the field, to allow alternative equipment manufacturers systems to be used (even after installation).

Figure 12A:
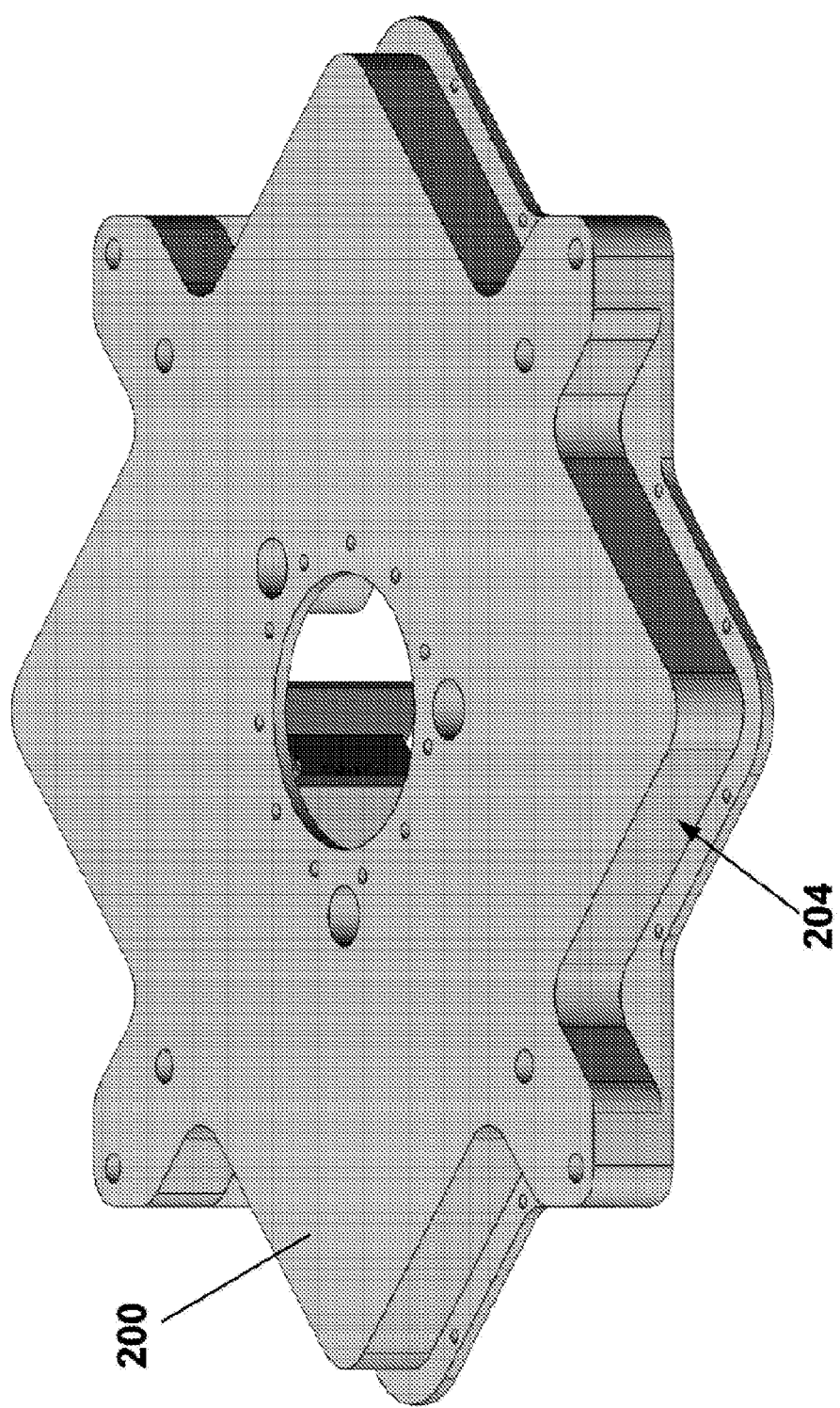
FIG. 12A is a view of a back face of an interface plate of the interface assembly of FIGS. 10 and 11.

FIG. 12 shows the inside, i.e. the chassis 206 side of the Interface Plate 204. This plate is suitable to attach to one of several possible alternative manufacturer's equipment, in place of that manufacturer's standard antenna and E-band feed.

Figure 3D:
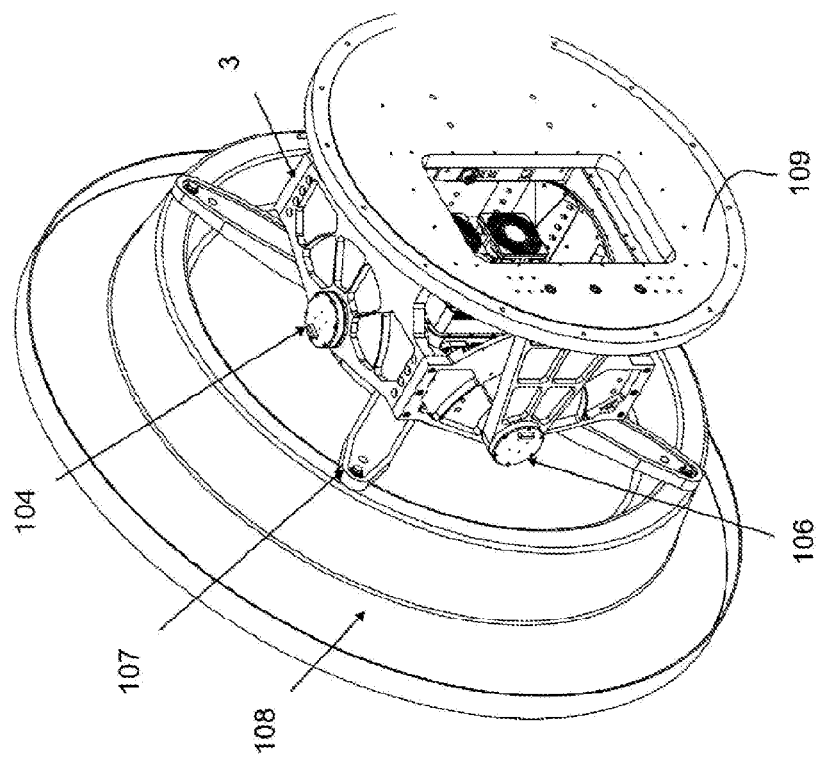
FIG. 3D is a detailed rear view of the gimbal and antenna.
Figure 3C:
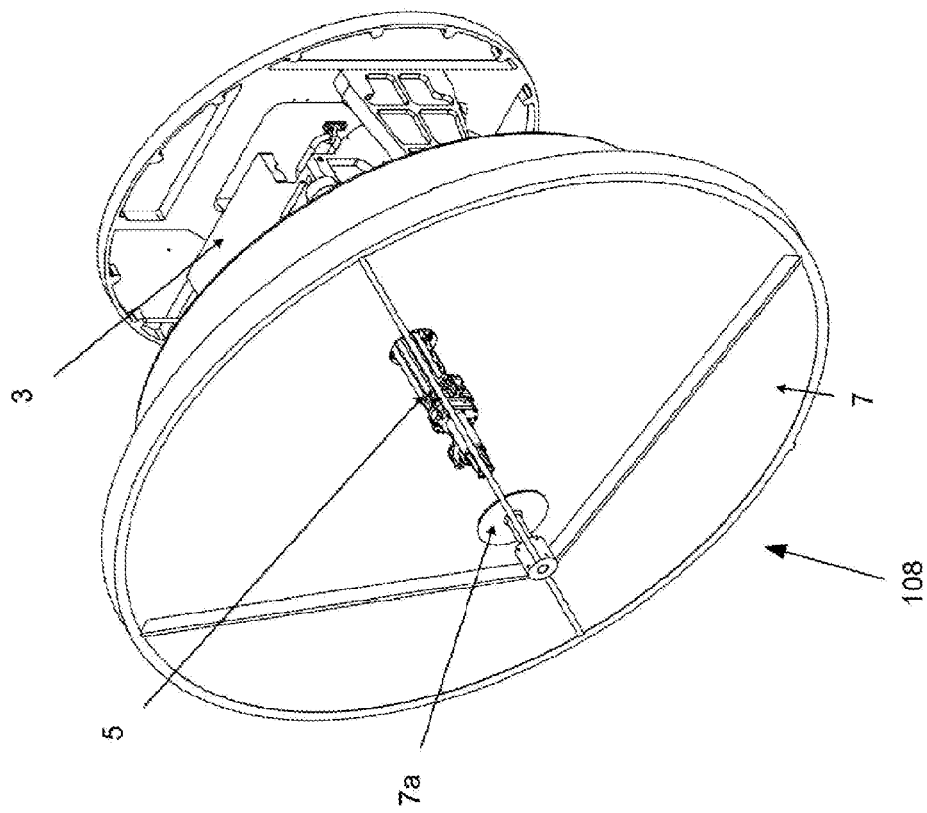
FIG. 3C is a detailed front view of the antenna system and gimbal.
Figure 3E:
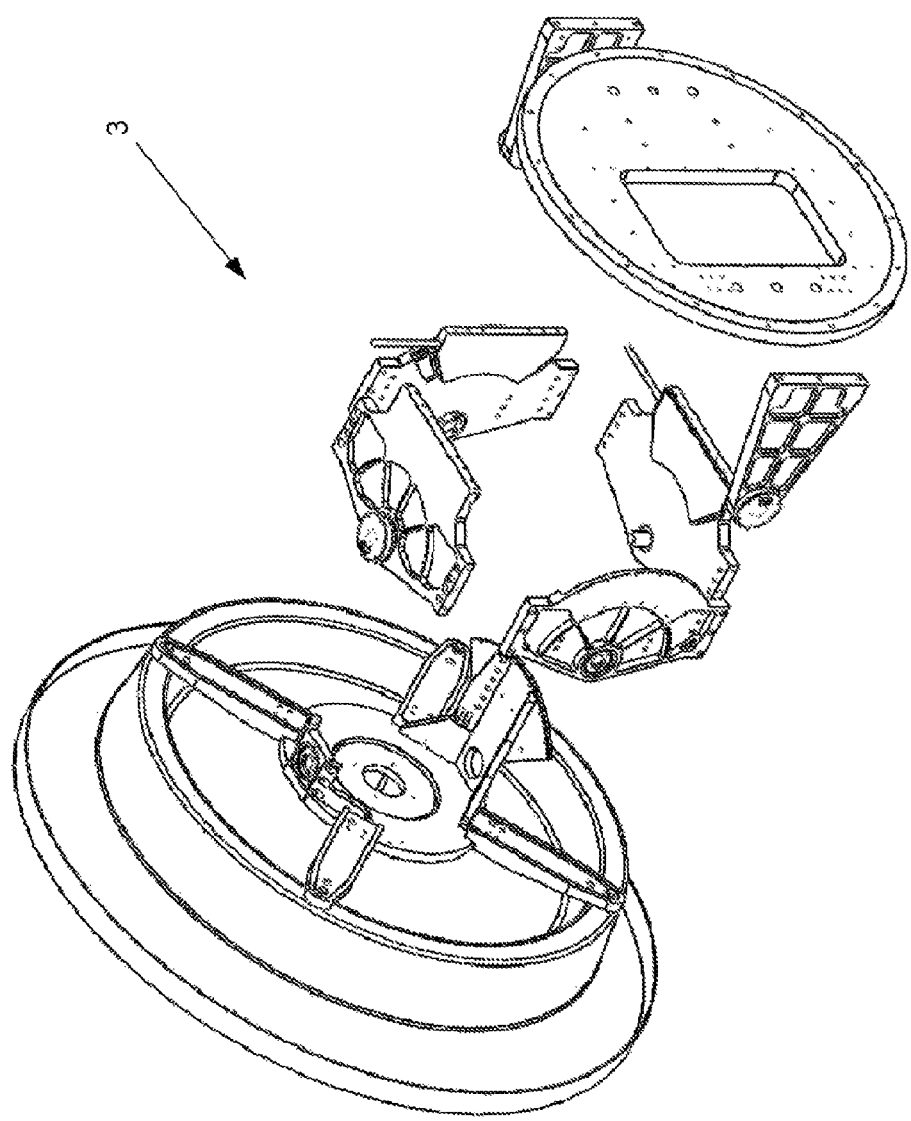
FIG. 3E is an exploded view of the gimbal and antenna.
Figure 13B:
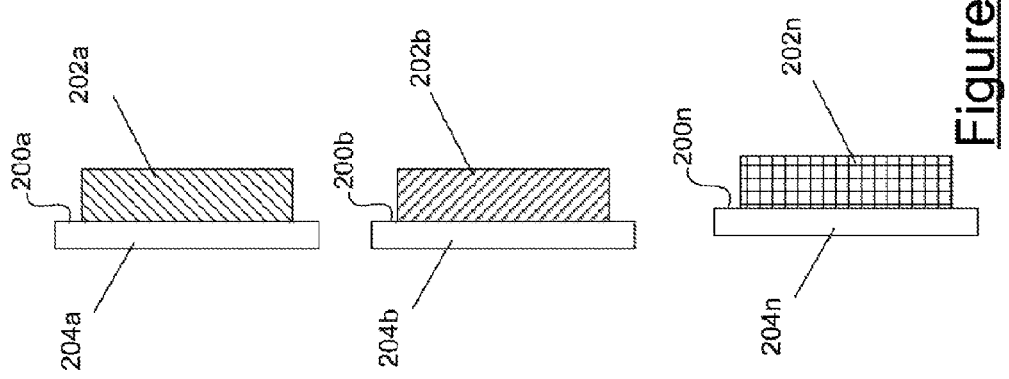
FIG. 13 is a stylized diagram showing the interface assembly in use coupling a piece of communications equipment to a stabilization assembly.
Figure 13A:
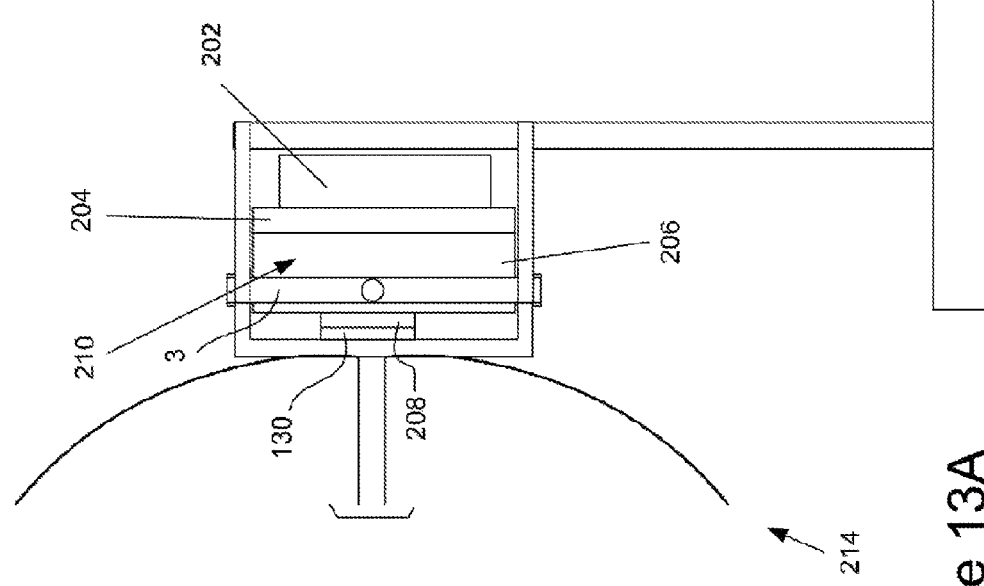

FIG. 13A is a stylized diagram showing the interface assembly in use and including an interface plate 204 coupling a corresponding piece of communications equipment 202 inside a stabilization assembly, e.g. an assembly similar to that shown in FIG. 3D, and whose front plate 208 attaches to the antenna feed interface, e.g. the interface plate 130. With reference to FIG. 13B, the interface plate 204 and the communications equipment 202 may be replaced with any one of the paired interface plates 204a to 204n and communications equipment 202a to 202n. For example, interface plate 204b is formed to have a back face 200 that complements the mounting formations of communications equipment 202b and similarly for the other interface plate and communications equipment pairs.

Although embodiments of the invention have been described with reference to communications at E-band frequencies, it is recognized that the technique is equally applicable to operation at other bands, such as Q-band or V-band, where the very high radio frequency used for the data communications results in narrow beam-widths that may require antenna stabilization to maintain pointing between two antennas at both ends of the communications link.

It will be understood that preferred embodiments of the invention provide an interface arrangement that permits the previously described pointing technology to be used with generic communications equipment, allowing such equipment to be used with large antennas or on towers subject to movement.

The above description identifies at least one specific, substantial and credible use for the invention.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting, the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A data communications wireless link comprising:
opposed link ends, each said link end including;
a redirecting assembly,
a directional antenna coupled to the redirecting assembly and including a feed;
a tracking beacon comprising an RF oscillator;
the feed including a primary receptor for signals in a first frequency band associated with data traffic of the link and one or more secondary receptors disposed about the primary receptor for signals in a second frequency band associated with the tracking beacon for a beam with wider beamwidth than that of a beam in the first frequency band for assisting alignment of the ends; and
a control system in communication with the one or more secondary receptors and arranged to control the redirecting assembly in response to variations in the strength of a signal from the tracking beacon of the opposed link end;
whereby the directional antennas are brought into alignment by the respective redirecting assemblies in response to signals from the opposed tracking beacons.

2. A data communications wireless link according to claim 1, wherein the secondary receptors of the feed of each link end comprise first and second paired receptors about the primary receptor for signals in the second frequency band;

and wherein each of the opposed link ends comprises a monopulse control system in communication with respective first and second paired receptors and arranged to control the respective redirecting assembly in response to variations in said beacon signal from the opposite link end.

3. An apparatus according to claim 1, wherein each of the opposed link ends includes:
an interface assembly having a front face mounted to the feed; and
a wireless data communications assembly mounted to a back face of the interface assembly and thereby coupled to the feed;
wherein the back face of the interface assembly is arranged to mate with coupling formations of the wireless data communications assembly.

4. A method for aligning first and second ends of a wireless link, the first and second ends including respective first and second directional antennas passing data communications signals therebetween, the method including:
redirecting the first directional antenna in response to variations in a second beacon signal emanating from the second end; and
redirecting the second directional antenna in response to variations in a first beacon signal emanating from the first end;
wherein the first and second beacon signals are distinct from the data communications signals and wherein the first and second beacon signals are of a wider beamwidth than the data communication signals for facilitating alignment of said ends of the terrestrial link.

5. A method according to claim 4 including:
Narrowing a beamwidth of the second beacon signal, subsequent to acquisition thereof by the first end, for improved accuracy in redirecting the first antenna; and
narrowing a beamwidth of the first beacon signal, subsequent to acquisition thereof by the second end, for improved accuracy in redirecting the second antenna.

6. A method according to claim 4, wherein the beacons are in in the K-band (18 GHz to 27 GHz) and the data communication signals are in the E-band (75 GHz to 85 GHz).

7. A method according to claim 6, wherein the first and second beacon signals have beamwidths sufficient to accommodate a range of angular perturbations of the first or second antenna from mutual alignment.

8. A method according claim 4 wherein each of the first and second antennas receive the data communication signals and a corresponding one of said beacon signals along a coincident boresight, the method including:
redirecting the first and second antennas in response to the second and first beacon signals until the data communication signal is acquired at each link end; and
then redirecting the first and second antennas in response to variations in the data communication signal.

9. A method according to claim 8, wherein the step of redirecting the first and second antennas in response to variations in the beacon signals includes applying monopulse processes at each end of the link.

10. A method according to claim 8 including redirecting the first and second antennas to mechanically scan for boresights associated with the beacon signals.

* * * * *